US009256731B2

(12) United States Patent
Sasao et al.

(10) Patent No.: US 9,256,731 B2
(45) Date of Patent: Feb. 9, 2016

(54) SYSTEM, INFORMATION PROCESSING APPARATUS, SECURE MODULE, AND VERIFICATION METHOD

(71) Applicant: Socionext Inc., Yokohama-shi, Kanagawa (JP)

(72) Inventors: Tetsuya Sasao, Machida (JP); Masakazu Takakusu, Suntou (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 14/292,053

(22) Filed: May 30, 2014

(65) Prior Publication Data

US 2014/0359306 A1    Dec. 4, 2014

(30) Foreign Application Priority Data

Jun. 3, 2013   (JP) .................................. 2013-116825

(51) Int. Cl.
| | |
|---|---|
| G06F 11/30 | (2006.01) |
| G06F 12/14 | (2006.01) |
| G06F 21/52 | (2013.01) |
| G06F 21/55 | (2013.01) |
| G06F 21/57 | (2013.01) |

(52) U.S. Cl.
CPC .............. *G06F 21/52* (2013.01); *G06F 21/554* (2013.01); *G06F 21/575* (2013.01)

(58) Field of Classification Search
CPC ................................. G06F 21/30; G06F 21/52
USPC ......................................................... 713/189
See application file for complete search history.

(56) References Cited

U.S. PATENT DOCUMENTS

| | | | |
|---|---|---|---|
| 6,175,924 B1 * | 1/2001 | Arnold .......................... | 713/189 |
| 7,805,758 B2 | 9/2010 | Hasegawa et al. | |
| 7,849,310 B2 | 12/2010 | Watt et al. | |

(Continued)

FOREIGN PATENT DOCUMENTS

| | | |
|---|---|---|
| JP | 2005-135265 | 5/2005 |
| JP | 2006-506751 | 2/2006 |

(Continued)

OTHER PUBLICATIONS

Patent Abstracts of Japan, Publication No. 2005-135265, Published May 26, 2005.

(Continued)

*Primary Examiner* — Dant Shaifer Harriman
(74) *Attorney, Agent, or Firm* — Staas & Halsey LLP

(57) ABSTRACT

A system includes a secure module structured to prevent information stored therein from being externally referenced; and an information processing apparatus configured to enable communication with the secure module. The information processing apparatus includes a first computer configured to execute a first verification process of verifying whether an application under execution by the information processing apparatus is in a secure state. The secure module includes a second computer, and a storage unit configured to store at least any one among a first feature amount obtained by extracting a feature of execution code of the first verification process, and execution code of an authentication process of authenticating the first verification process. The second computer is configured to execute a second verification process of verifying whether the first verification process under execution by the first computer is in a secure state, based on stored contents of the storage unit.

11 Claims, 15 Drawing Sheets

(56) References Cited

U.S. PATENT DOCUMENTS

| | | | |
|---|---|---|---|
| 2004/0107354 A1* | 6/2004 | Larsen | 713/189 |
| 2008/0082813 A1* | 4/2008 | Chow et al. | 713/2 |
| 2012/0204254 A1* | 8/2012 | Voss | 726/18 |
| 2012/0278608 A1 | 11/2012 | Kohiyama et al. | |

FOREIGN PATENT DOCUMENTS

| | | |
|---|---|---|
| JP | 2007-133860 | 5/2007 |
| JP | 2012-234362 | 11/2012 |

OTHER PUBLICATIONS

Espacenet Abstract for Publication No. 2006-506751, Published Feb. 23, 2006.

Patent Abstracts of Japan, Publication No. 2007-133860, Published May 31, 2007.

Patent Abstracts of Japan, Publication No. 2012-234362, Published Nov. 29, 2012.

* cited by examiner

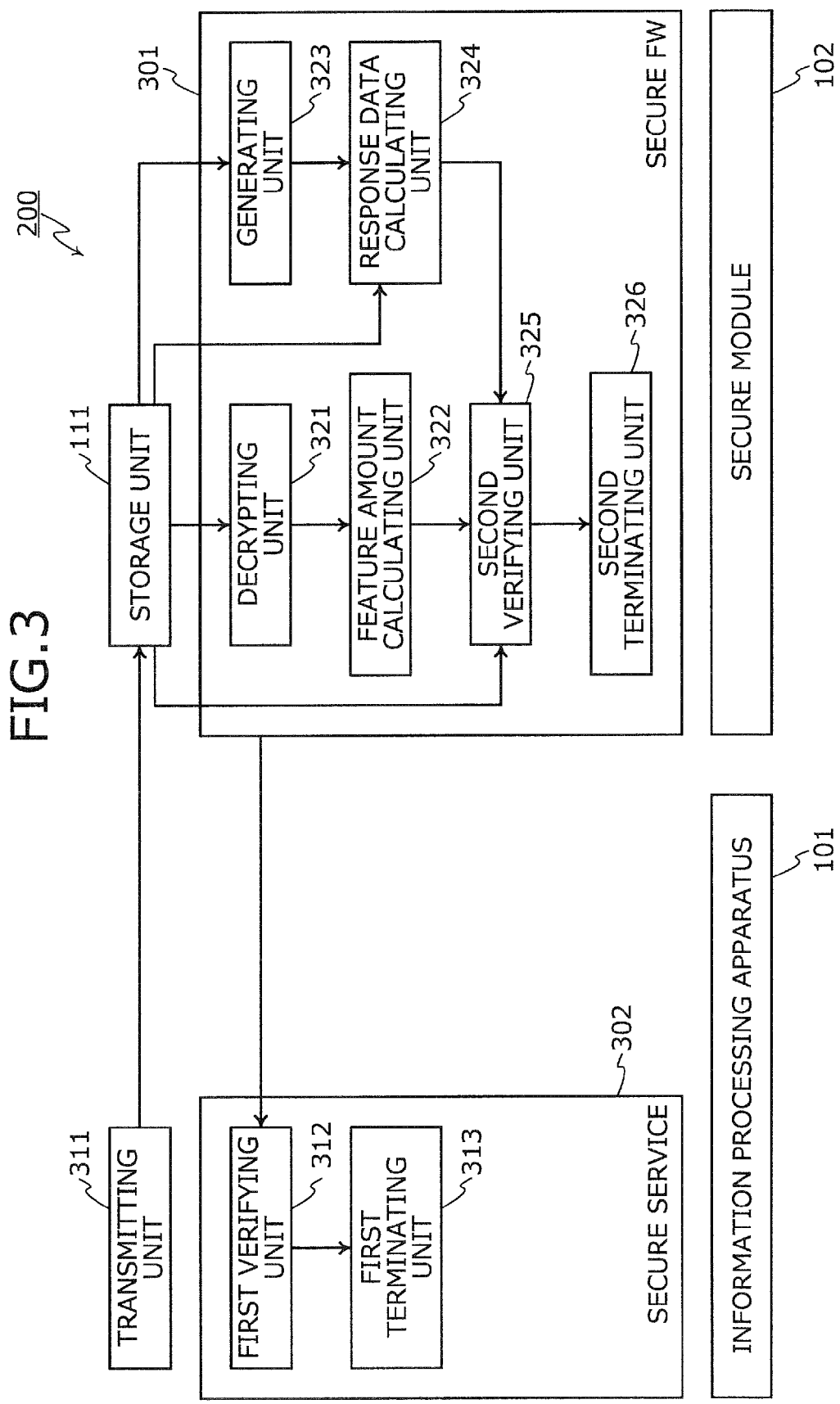

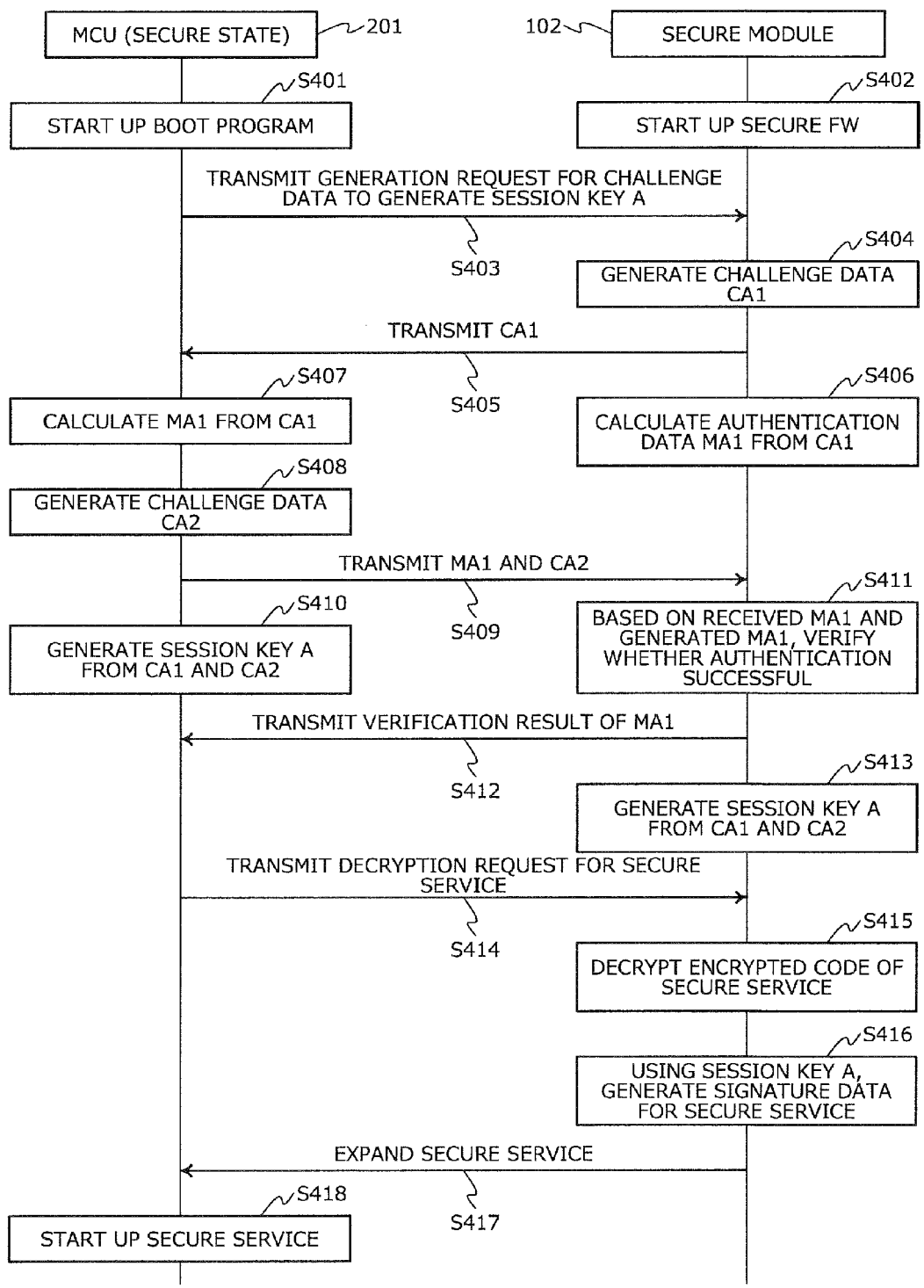

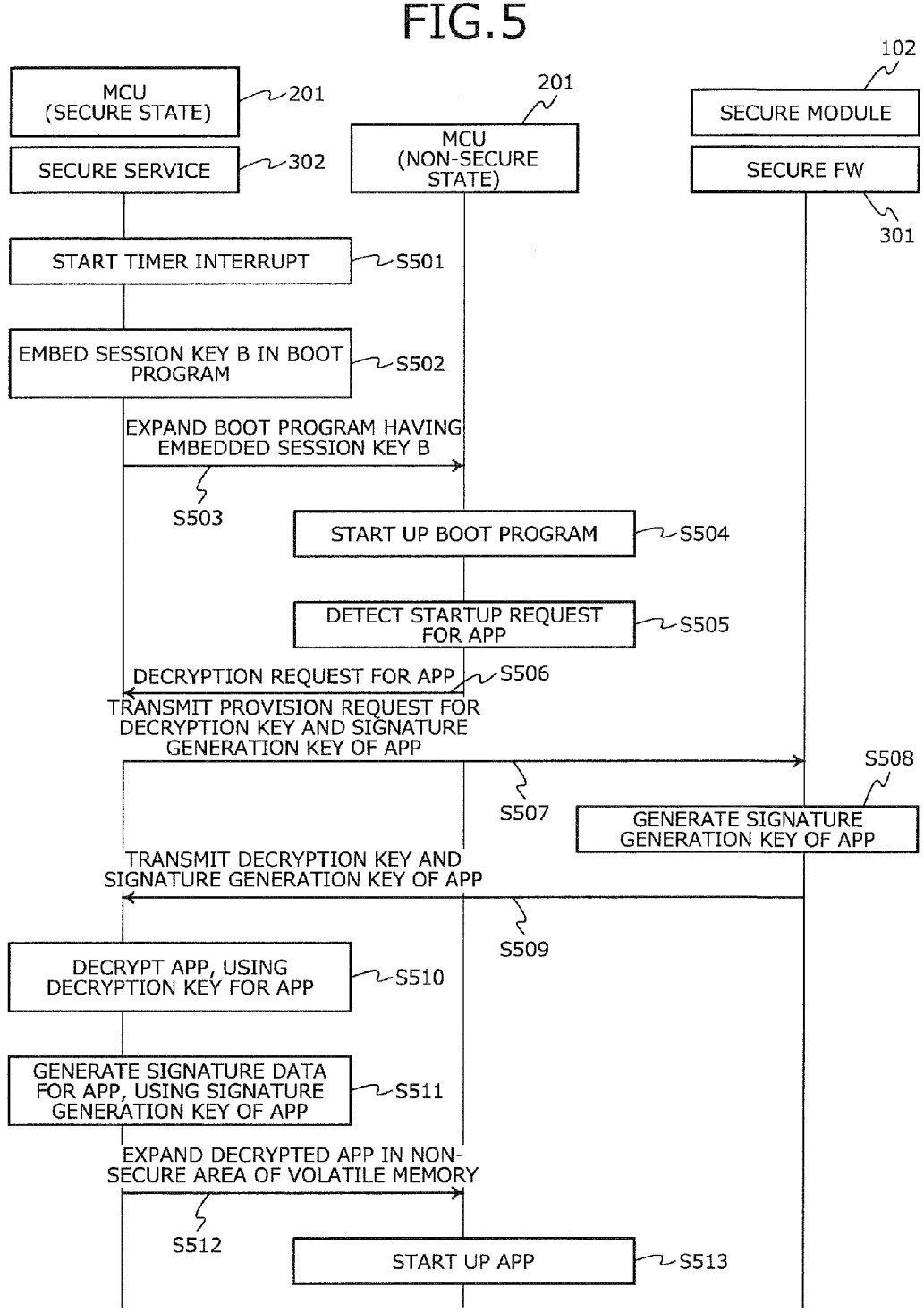

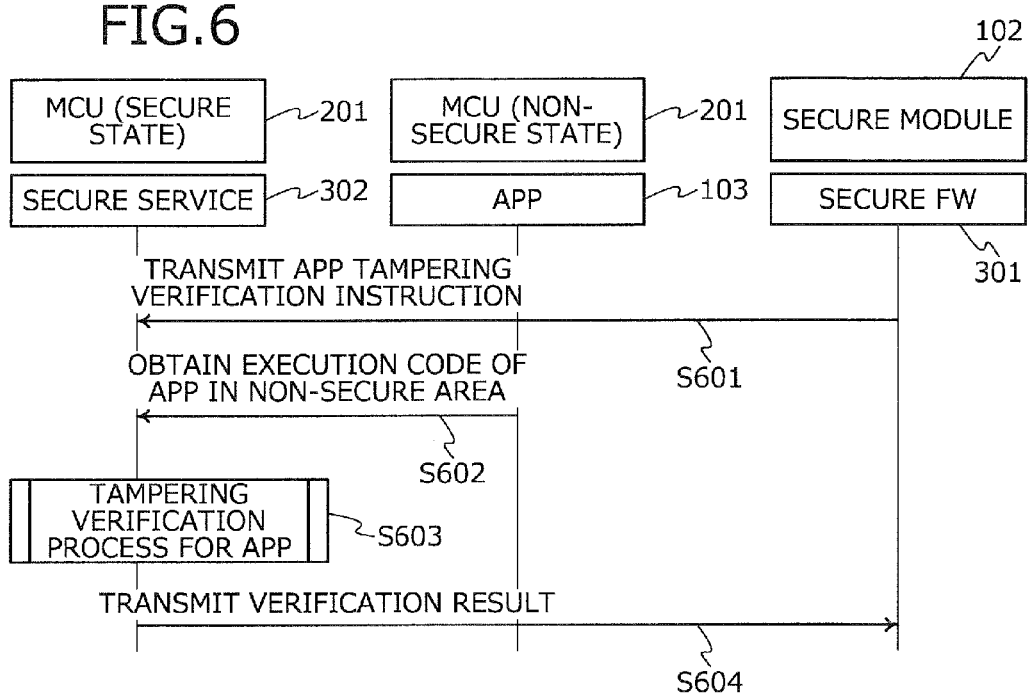
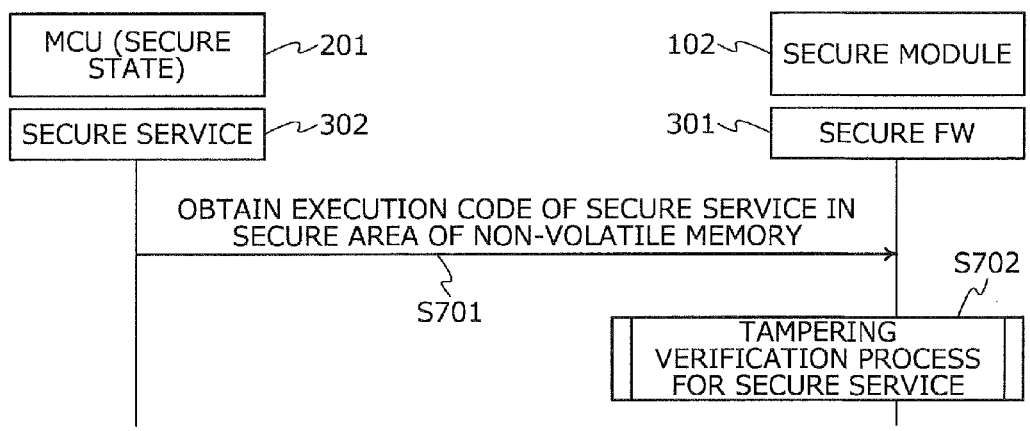

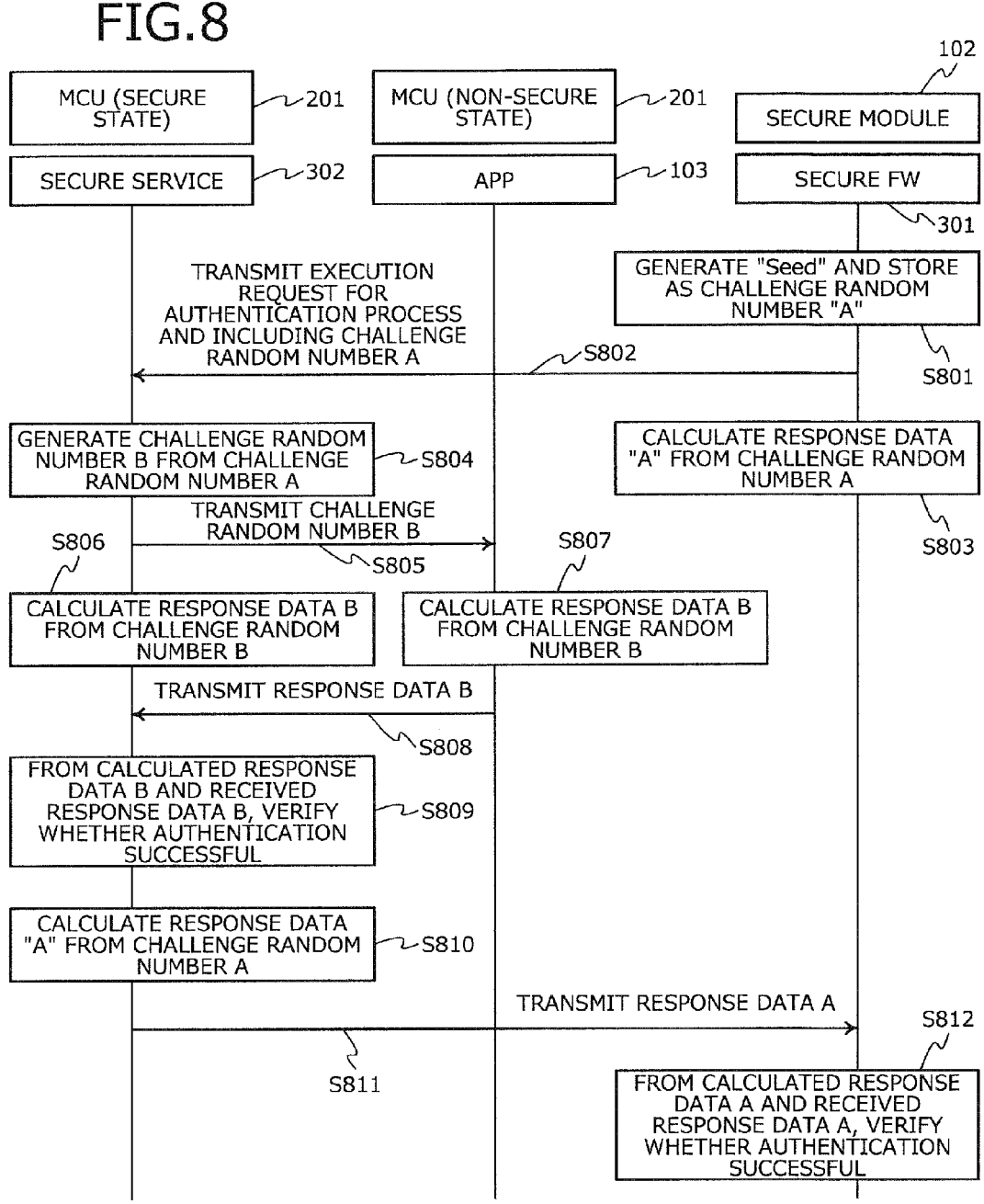

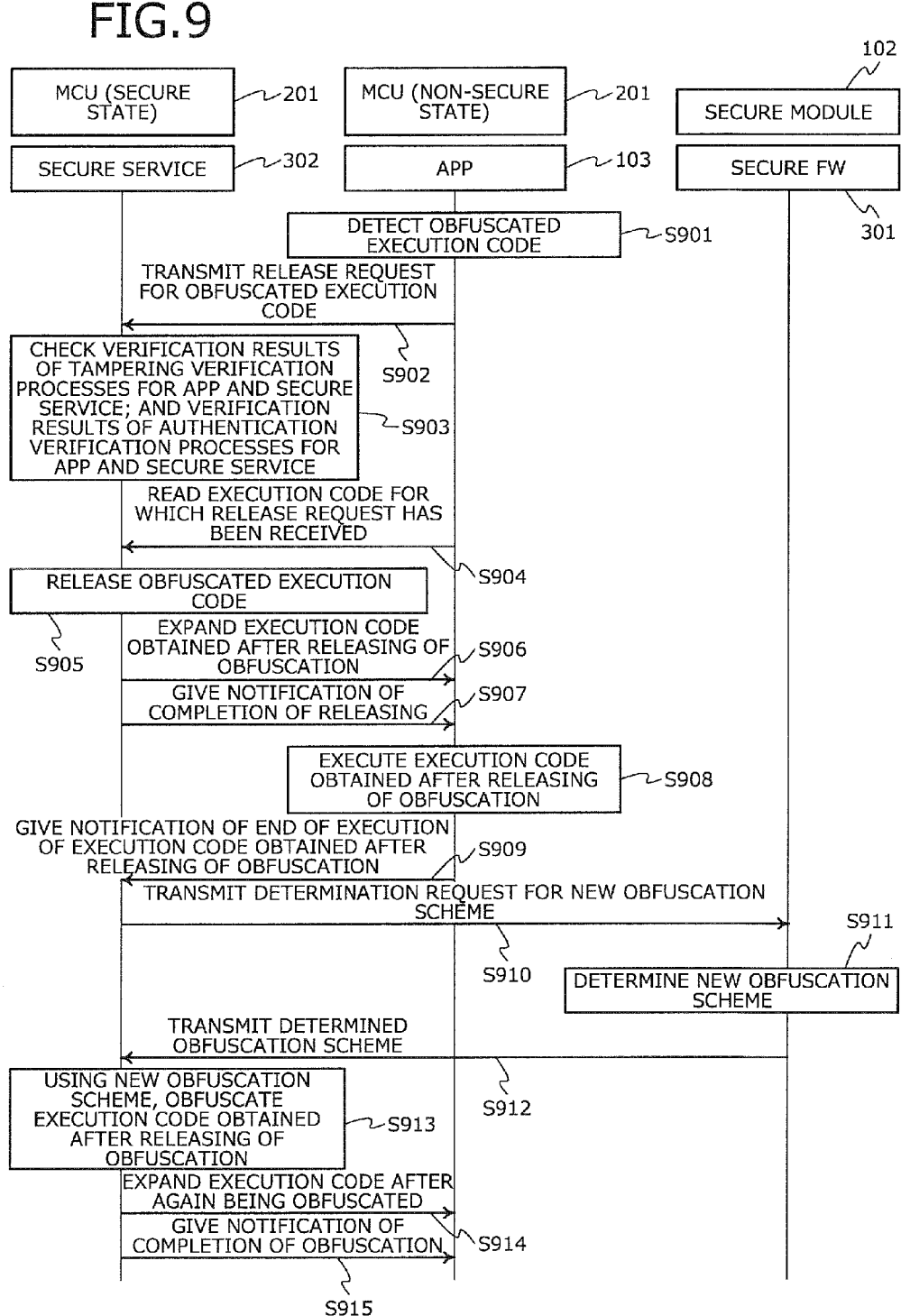

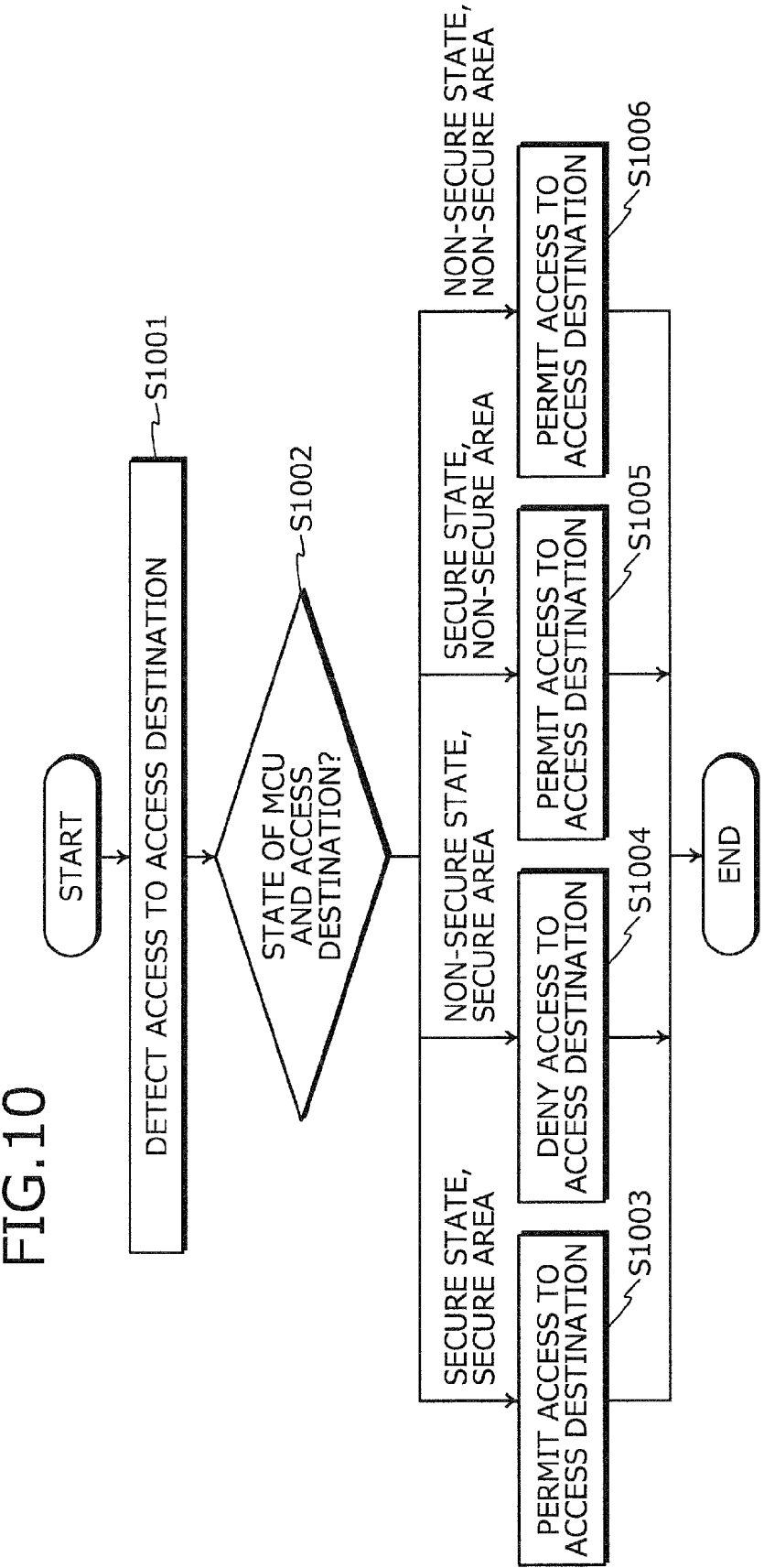

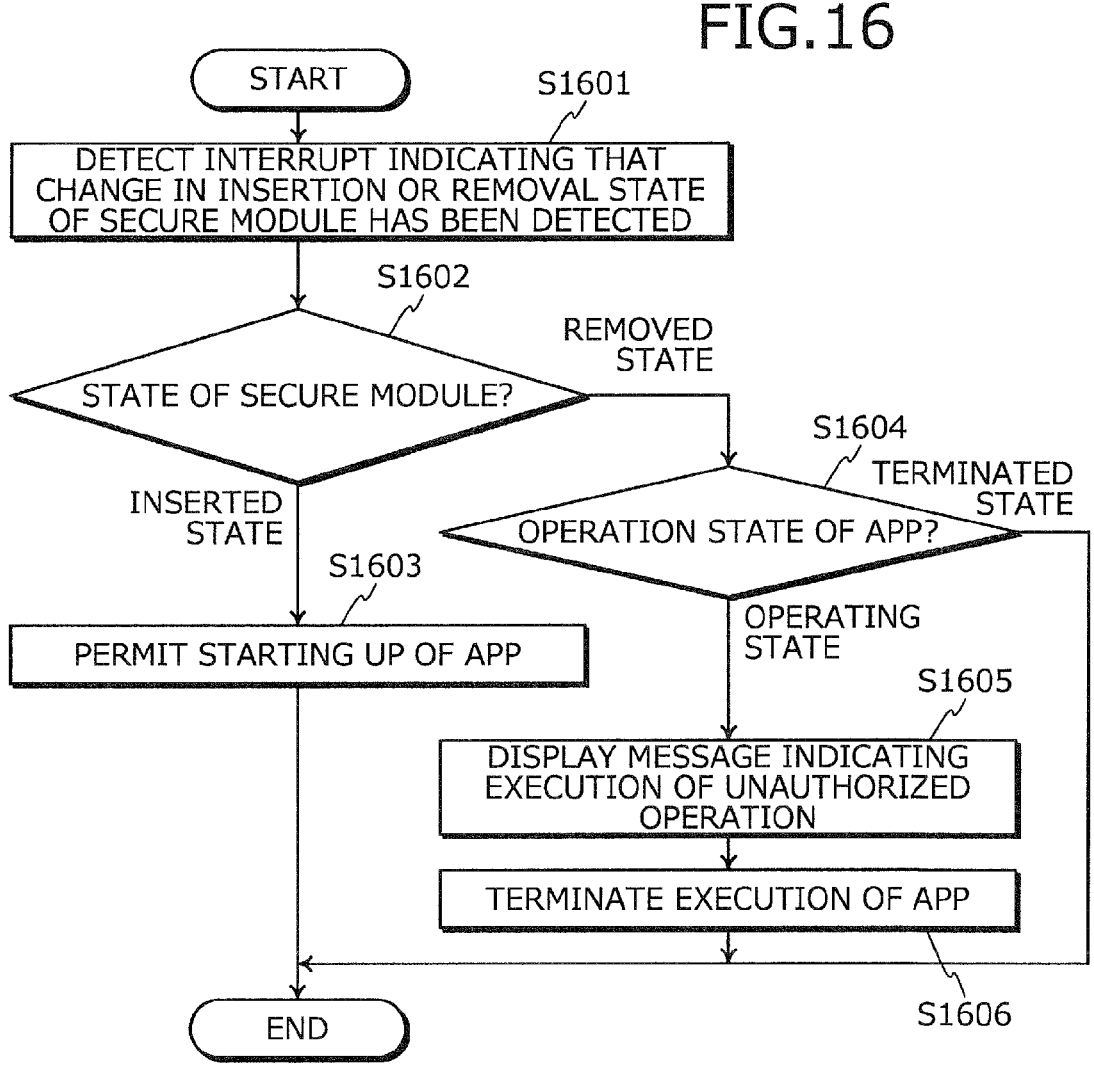

SYSTEM, INFORMATION PROCESSING APPARATUS, SECURE MODULE, AND VERIFICATION METHOD

CROSS REFERENCE TO RELATED APPLICATIONS

This application is based upon and claims the benefit of priority of the prior Japanese Patent Application No. 2013-116825, filed on Jun. 3, 2013, the entire contents of which are incorporated herein by reference.

FIELD

The embodiments discussed herein are related to a system, an information processing apparatus, a secure module, and a verification method.

BACKGROUND

Conventionally, an apparatus called a "secure module" verifies whether the state of an application under execution by an information processing apparatus connected to the secure module, is secure. For example, according to a related technique, a program to be written into a main memory whose security is not guaranteed is encrypted by a secure module whose reliability is guaranteed, and is written into the main memory. According to another technique, a secure module recovers an encrypted program in a first storage unit to the executable state thereof, writes the recovered program into a second storage unit, and deletes the recovered program from the second storage unit after execution of the recovered program by a CPU. According to another technique, if no falsification has been made to load destination information that indicates a memory area of an address space in the memory, to be occupied by an execution image of a program, the execution image of the program is generated and is used for the execution; and thereby, the execution image is loaded to the memory area indicated by the load destination information. According to yet another technique, when a processor executes a program in a safety mode, the program accesses safety data that is inaccessible when the processor operates in a non-safety mode, and switching between the safety mode and the non-safety mode is executed through a monitor mode. For examples, refer to Japanese Laid-Open Patent Publication Nos. 2012-234362, 2005-135265, and 2007-133860; and Published Japanese-Translation of PCT Application, Publication No. 2006-506751.

However, according to the conventional techniques, the processing load on the secure module increases when the number of applications under execution by the information processing apparatus in a system that includes a secure module is great, or when the volume of execution code of the applications is great.

SUMMARY

According to an aspect of an embodiment, a system includes a secure module structured to prevent information stored therein from being externally referenced; and an information processing apparatus configured to enable communication with the secure module. The information processing apparatus includes a first computer configured to execute a first verification process of verifying whether an application under execution by the information processing apparatus is in a secure state. The secure module includes a second computer, and a storage unit configured to store at least any one among a first feature amount obtained by extracting a feature of execution code of the first verification process, and execution code of an authentication process of authenticating the first verification process. The second computer is configured to execute a second verification process of verifying whether the first verification process under execution by the first computer is in a secure state, based on stored contents of the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a block diagram of an example of a functional configuration of the computer system according to the first embodiment;

FIG. 4 is a sequence diagram (Part I) of an example of processing by the computer system;

FIG. 5 is a sequence diagram (Part II) of the example of the processing by the computer system;

FIG. 6 is a sequence diagram of an example of a tampering verification process for application software;

FIG. 7 is a sequence diagram of an example of the tampering verification process of a secure service;

FIG. 8 is a sequence diagram of an example of authentication processes for the secure service and the application software;

FIG. 9 is a sequence diagram of an example of an execution process for a portion to be obfuscated of the application software;

FIG. 10 is a flowchart of an example of a procedure for an operation process procedure of a controller;

FIG. 16 is a flowchart of an example of a procedure for a process executed when an insertion or a removal state of a secure module changes.

DESCRIPTION OF EMBODIMENTS

Embodiments of a system, an information processing apparatus, a secure module, and a verification method will be described in detail with reference to the accompanying drawings.

Figure 1:
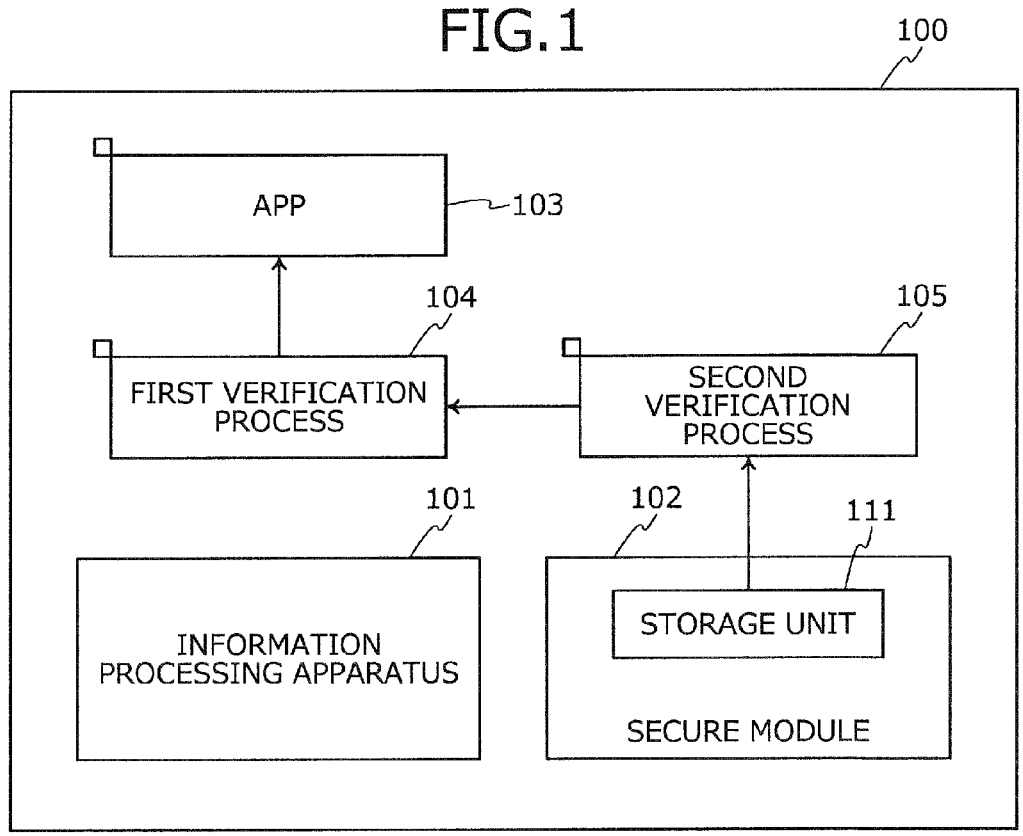
FIG. 1 is an explanatory diagram of an example of operation of a system according to a first embodiment.

FIG. 1 is an explanatory diagram of an example of operation of a system according to a first embodiment. A system 100 includes an information processing apparatus 101 and a secure module 102. The information processing apparatus 101 is an apparatus configured to communicate with the secure module 102. The secure module 102 is an apparatus structured to prevent information stored in the secure module 102 from being externally referenced.

The information processing apparatus 102 has various functions and executes high level application software. The "application software" will be referred to as an "app". Technical specifications of an app are open to ordinary development engineers and therefore, apps tend to be under attack such as by analysis, tampering, and unauthorized operation executed by peeping on the app.

According to an existing technique, to protect an app from the attacks such as by analysis, tampering, and unauthorized operation executed by peeping on the app, the secure module 102 protects the app executed by the information processing apparatus 101 and verifies that the app is in a secure state. The "secure state" refers to a state where no danger is present such as an attack, an invasion, eavesdropping, and tampering, performed externally executed.

However, the app executed by the information processing apparatus 101 is highly functional and the volume of execution code thereof is high and therefore, the processing volume to be processed by the secure module 102 is also high. Because the processing volume processed by the secure module 102 is high, the cost of the secure module 102 increases.

Therefore, in the system 100 according to the present embodiment, the information processing apparatus 101 executes a process of verifying the validity of the app 103 and the secure module 102 verifies the validity of the process of verifying the validity of the app 103. Thereby, the system 100 can execute the app 103 in a secure state, while suppressing the processing load on the secure module 102.

The information processing apparatus 101 executes a first verification process 104 of verifying whether the app 103 under execution is in a secure state. The app 103 is a process that handles information that is not desired to be externally referenced such as a reproduction process of a copyrighted content or a settlement process. The "verification process executed by the first verification process 104" includes a tampering verification process of verifying whether any execution code of the app 103 has been tampered with, and an authentication process of verifying whether the app 103 is a valid communication counterpart. The tampering verification process of the app 103 will be described later with reference to FIG. 6. The authentication process will be described later with reference to FIG. 8.

The secure module 102 is configured to access a storage unit 111 that stores any one of or both: a first feature amount obtained by extracting the feature of the execution code of the first verification process 104, and execution code of the authentication process of authenticating the first verification process 104. The feature amount obtained by extracting the feature of the execution code is, for example, a hash value of the execution code. A function to calculate the hash value may be Message-Digest 5 (MD5), a secure hash algorithm (SHA)-1, or SHA-256.

The secure module 102 executes a second verification process 105 of verifying whether the first verification process 104 under execution is in a secure state, based on the stored contents of the storage unit 111. The "verification process executed by the second verification process 105" includes: a tampering verification process of verifying whether the execution code of the first verification process 104 has been tampered with; and an authentication process of verifying whether the first verification process 104 is a valid communication counterpart.

The stored contents of the storage unit 111 cannot be externally referenced and cannot be tampered with and therefore, the secure module 102 can correctly determine whether the first verification process is in a secure state. Whether the app 103 is in a secure state can be correctly determined based on the first verification process that is determined to be in a secure state. In this manner, the system 100 correctly determines whether secure states are established and distributes the processing volume and thereby, reduces the cost of the secure module 102.

Figure 2:
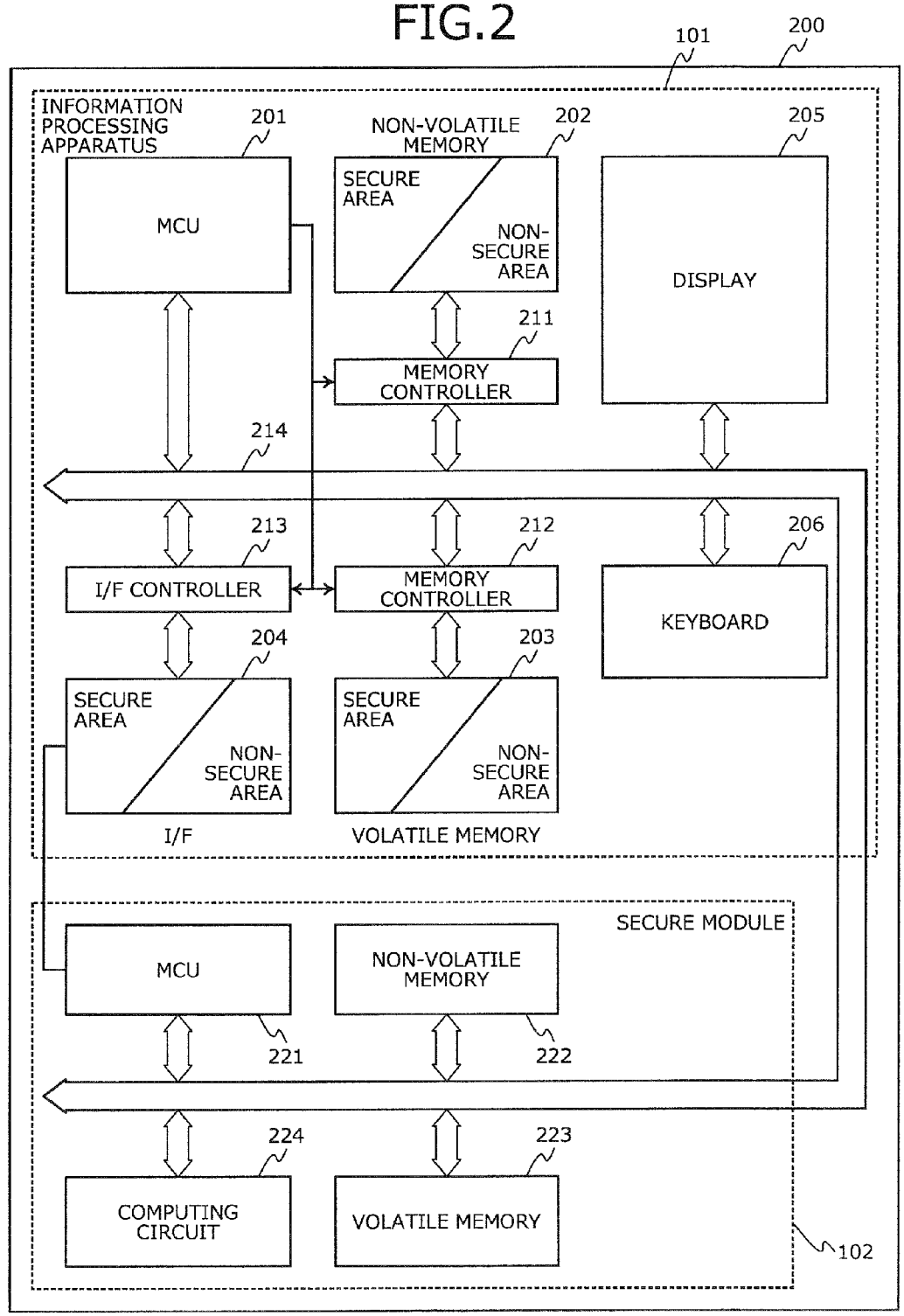
FIG. 2 is a block diagram of an example of configuration of a computer system according to the first embodiment.

FIG. 2 is a block diagram of an example of configuration of a computer system according to the first embodiment. The computer system 200 includes the information processing apparatus 101 and the secure module 102. It is assumed that the computer system 200 is a mobile terminal such as a mobile telephone or a smartphone. The computer system 200 may be a personal computer, etc.

The information processing apparatus 101 includes a micro control unit (MCU) 201, non-volatile memory 202, volatile memory 203, an interface (I/F) 204, a display 205, a keyboard 206, memory controllers 211 and 212, and an I/F controller 213. The MCU 201, the memory controllers 211 and 212, the I/F controller 213, the display 205, and the keyboard 206 are connected to each other by a bus 214.

The secure module 102 includes an MCU 221, non-volatile memory 222, volatile memory 223, and a computing circuit 224. The components from the MCU 221 to the computing circuit 224 are connected to each other by the bus 214.

The MCU 201 is a computation processing apparatus configured to supervise the control of the overall information processing apparatus 101; has two states including a secure mode and a non-secure mode; and includes a mechanism for the MCU 201 to transition between the two states.

The non-volatile memory 202 is memory configured to store programs such as a boot program. The volatile memory 203 is a volatile memory used as a work area of the MCU 201. The I/F 204 is connected to a network such as a local area network (LAN), a wide area network (WAN), or the Internet through a communication line; is connected to other apparatuses through the network; supervises the interface between the network and the internal components; and controls the input and output of data with respect to the secure module 102 and the other apparatuses. For example, a modem or a LAN adaptor may be employed as the I/F 204.

The storage areas retained by the components from the non-volatile memory 202 to the I/F 204 are classified into secure areas and non-secure areas. The secure areas are accessed when the MCU 201 is in the secure mode. The non-secure areas are accessed when the MCU 201 is in the secure mode or non-secure mode. For example, among the address areas assigned to the storage areas of the non-volatile memory 202 and the volatile memory 203, some address areas are set to be the address areas of the secure areas and the other address areas thereof are set to be the address areas of the non-secure areas. For example, some address areas are set to be the address areas of the secure areas among the address areas assigned by a memory mapped I/O of a setting register or a control register to be the storage area of the I/F 204, and the other address areas thereof are set to be the address areas of the non-secure areas.

The display 205 displays data such as a document, an image, and function information in addition to a cursor, an icon, or a tool box. For example, a TFT liquid crystal display may be employed as the display 205.

The keyboard 206 includes keys to input characters, numbers, various instructions, etc., is used to input data, and may be a touch panel input pad or a touch panel numerical keypad.

The memory controllers 211 and 212 are apparatuses that respectively control access to the non-volatile memory 202 and to the volatile memory 203. The I/F controller 213 is an apparatus controlling access to the I/F 204. For example, when the memory controller 211 detects access to the non-volatile memory 202, the memory controller 211 obtains the state of the MCU and the address of the access destination, and determines whether the access is to be permitted or denied. The specific content of the determination will be described later with reference to FIG. 10. Hereinafter, the components from the memory controller 211 to the I/F controller 213 will be collectively referred to as "controller".

The MCU 221 is a computation processing apparatus configured to supervise the control of the overall secure module 102. The non-volatile memory 222 is memory configured to store programs such as a boot program and secure firmware (FW). The "secure FW" is firmware controlling the secure module 102. The volatile memory 223 is volatile memory used as a work area of the MCU 221. The computing circuit 224 is a circuit configured to execute an encryption process, a decryption process, a hash value calculation process, etc.

Functions of the computer system 200 will be described. FIG. 3 is a block diagram of an example of a functional configuration of the computer system according to the first embodiment. The computer system 200 includes the storage unit 111, a transmitting unit 311, a first verifying unit 312, a first terminating unit 313, a decrypting unit 321, a feature amount calculating unit 322, a generating unit 323, a response data calculating unit 324, a second verifying unit 325, and a second terminating unit 326.

The transmitting unit 311 is a function included in the boot program of the information processing apparatus 101. The first verifying unit 312 and the first terminating unit 313 are functions included in a secure service 302 executed by the information processing apparatus 101. The boot program and the secure service 302 implement the functions of the components from the transmitting unit 311 to the first terminating unit 313 by causing the MCU 201 to execute the programs stored in a storage apparatus. The "storage apparatus" is, for example, the non-volatile memory 202 depicted in FIG. 2. The secure service 302 corresponds to the first verification process 104 depicted in FIG. 1.

The components from the decrypting unit 321 to the second terminating unit 326 are functions included in a secure FW 301 executed by the secure module 102. The secure FW 301 implements the functions of the components from the decrypting unit 321 to the second terminating unit 326 by causing the MCU 221 to execute the programs stored in a storage apparatus. The "storage apparatus" is, for example, the non-volatile memory 222 depicted in FIG. 2. The secure FW 301 corresponds to the second verification process 105 depicted in FIG. 1.

The storage unit 111 stores any one of or both: the first feature amount obtained by extracting the feature of the execution code of the secure service 302, and the execution code of the authentication process of authenticating the secure service 302. The storage unit 111 is present in the secure area of the volatile memory 203.

The storage unit 111 may further store items such as encrypted code obtained by encrypting the execution code of the secure service 302, and a decryption key capable of decrypting the encrypted code. The encryption scheme of the execution code of the secure service 302 may be a common key scheme or a public key scheme. When the encryption scheme of the execution code of the secure service 302 is a common key scheme, the decryption key is same as the encryption key. When the encryption scheme is a public key scheme, the decryption key is a counterpart to the encryption key.

The transmitting unit 311 transmits to the secure module 102, the encrypted code obtained by encrypting the secure service 302 stored by the information processing apparatus 101.

The first verifying unit 312 executes the secure service 302 to verify whether the app 103 under execution by the information processing apparatus 101 is in a secure state.

As the result of the transmission of the encrypted code by the transmitting unit 311, the first verifying unit 312 may verify whether the app 103 is in a secure state, according to the execution code of the secure service 302 transmitted by the secure module 102. The result of the verification is stored to the secure area of the volatile memory 203.

If the first verifying unit 312 verifies that the app 103 is not in a secure state, the first terminating unit 313 terminates the execution of the app 103. The specific method of terminating the app 103 will be described later with reference to FIG. 6.

The decrypting unit 321 decrypts the execution code of the secure service 302 using the decryption key from the encrypted code obtained by encrypting the execution code of the secure service 302. The decrypted execution code of the secure service 302 is transmitted to the secure service 302.

The feature amount calculating unit 322 calculates a second feature amount obtained by extracting the feature of the execution code of the secure service 302 under execution by the first verifying unit 312. The calculated second feature amount is stored to the secure area of the volatile memory 203.

The feature amount calculating unit 322 may calculate the first feature amount obtained by extracting the feature of the execution code of the secure service 302 decrypted by the decrypting unit 321 and may store the calculated first feature amount to the storage unit 111.

The generating unit 323 generates according to the execution code of the authentication process, a challenge random number used to authenticate the secure service 302. The generated challenge random number is stored to the volatile memory 223.

The response data calculating unit 324 calculates first response data based on the challenge random number generated by the generating unit 323 according to the execution code of the authentication process. The calculated first response data is stored to the volatile memory 223.

The second verifying unit 325 executes based on the stored contents of the storage unit 111, the secure FW 301 that verifies whether the secure service 302 under execution by the first verifying unit 312 is in a secure state.

The second verifying unit 325 may verify whether the under execution secure service 302 is in a secure state, by comparing the second feature amount calculated by the feature amount calculating unit 322 and the first feature amount stored in the storage unit 111. For example, the second verifying unit 325 verifies that the secure service 302 is in a secure state when the second and the first feature amounts match.

The second verifying unit 325 may verify whether the secure service 302 under execution is in a secure state, by comparing the second feature amount calculated by the feature amount calculating unit 322 and the first feature amount calculated by the feature amount calculating unit 322 and stored in the storage unit.

It is assumed that the secure FW 301 transmits the challenge random number to the first verifying unit 312. In this case, for the secure FW 301, the secure service 302 under execution calculates second response data based on the challenge random number. The second verifying unit 325 may verify whether the secure service 302 under execution is in a secure state, by comparing the second response data and the first response data calculated by the response data calculating unit 324. The result of the verification is stored to the volatile memory 223.

If the second verifying unit 325 verifies that the secure service 302 under execution by the first verifying unit 312 is not in a secure state, the second terminating unit 326 terminates the execution of the secure service 302 by the first verifying unit 312. The method of terminating the secure service 302 will be described later with reference to FIG. 7.

A process sequence of the computer system 200 will be described with reference to FIGS. 4 and 5. The MCU 201 executes two types of programs, including the secure service 302 and the app 103. The secure service 302 is a program operating when the MCU 201 is in a secure state and plays a role in protecting the app 103 from being loaded and tampered with.

FIG. 4 is a sequence diagram (Part I) of an example of processing by the computer system. The MCU 201 is started up in a secure state when resetting thereof is cancelled. The MCU 201 starts up the boot program (step S401). The secure module 102 starts up the secure FW 301 (step S402).

After the startup of the boot program is completed, the CPU 201, in a secure state, executes the authentication process in a challenge response scheme to cause the secure module 102 to authenticate that the MCU 201 is in a secure state. When the authentication successfully comes to an end, the MCU 201, in a secure state, generates a session key "A" to protect communication via the secure module 102 from eavesdropping, and shares the generated session key A with the secure FW 301 operating on the secure module 102. To avoid the risk of the key to be identified due to the use of the same key for a long time, the MCU 201, in a secure state, regenerates the session key A for each boot.

Process steps from the authentication process to the session key generation will be described with reference to steps S403 to S413. The MCU 201, in a secure state, transmits a generation request for challenge data to generate the session key A (step S403). The secure FW 301 receives the generation request for the challenge data to generate the session key A and generates the challenge data CA1 (step S404). "CA1" is a random number of, for example, 16 [bytes]. The secure FW 301 transmits CA1 (step S405) and calculates authentication data MA1 from CA1 (step S406). "MA1" is a value calculated using CA1 by, for example, an advanced encryption standard message authentication code (AES-MAC) scheme.

The MCU 201, in a secure state, receives CA1 and calculates MA1 from CA1 (step S407) and simultaneously generates challenge data CA2 (step S408). "CA2" is a random number of, for example, 16 [bytes]. The MCU 201, in a secure state, transmits MA1 and CA2 (step S409). After generating CA2, the MCU 201, in a secure state, generates the session key A from CA1 and CA2 (step S410). For example, the MCU 201, in a secure state, obtains XOR of CA1 and CA2 and thereafter, encrypts the XOR using a key for calculating the 16-byte session key A, and uses the result of the encryption as the 16-byte session key A.

The secure FW 301 receives MA1 and CA2, verifies based on the received MA1 and the generated MA1, whether the authentication has been successfully executed (step S411), transmits the verification result of MA1 to the MCU 201 (step S412), and generates the session key A from CA1 and CA2 (step S413).

With the processes executed at the steps up to step S413, the generation of the session key A comes to an end and therefore, the MCU 201 starts up the secure service 302 and the secure service 302 executes the processes thereafter. The secure service 302 uses the session key A and therefore, the boot program of the MCU 201, in a secure state, is obtained by the secure service 302 by storing the session key A in the secure area of the volatile memory 203. Thus, the information processing apparatus 101 reduces the possibility that a third party obtains the session key A and thereby, prevents any access by the third party.

The process steps up to the startup of the secure service 302 will be described with reference to steps S414 to S418. The MCU 201, in a secure state, transmits a decryption request for the secure service 302 (step S414). The decryption request for the secure service 302 includes encrypted code obtained by encrypting the execution code of the secure service 302. The secure FW 301 receives the decryption request for the secure service 302, decrypts the encrypted code of the secure service 302 (step S415), and generates signature data for the secure service 302 using the session key A (step S416). As to the "signature data", the signature data for the secure service 302 is a hash value obtained by calculating the execution code of the secure service 302 using the session key A.

The secure FW 301 expands the secure service 302 (step S417). The MCU 201, in a secure state, starts up the secure service 302 (step S418). The processes of the secure service 302 executed after the startup will be described with reference to FIG. 5.

FIG. 5 is a sequence diagram (Part II) of the example of the processing by the computer system. The secure service 302 starts a timer interrupt periodically occurring during the secure state (step S501). The timer interrupt is set to be not maskable from the programs executed by the MCU 201 in a non-secure state. Thereby, monitoring by the secure service 302 can be activated.

The secure service 302 embeds a session key B in the boot program of the MCU 201, in a non-secure state (step S502). The "session key B" is, for example, a random number of 16 [bytes] generated each time the MCU 201 is started up in a non-secure state. The session key B itself may be added to the tail of the boot program of the MCU 201 in a non-secure state or a value obtained by generating an XOR of the session key B and a predetermined value may be added thereto, as an example of method of embedding the session key B. The secure service 302 expands in the non-secure area of the volatile memory 203, the boot program of the MCU 201 in a non-secure state, the boot program having the session key B embedded therein (step S503).

After the expansion of the boot program of the MCU 201 in a non-secure state, the MCU 201, in a non-secure state, starts up the boot program (step S504).

After the startup of the boot program, the MCU 201, in a non-secure state, detects a startup request for the app 103 issued by an operation of the user of the computer system 200 (step S505). The execution code of the app 103 is encrypted in advance and is stored in the non-secure area of the non-volatile memory 202. The key used for the decryption is stored in the secure module 102. Such processes will be described later with reference to FIG. 11 as a process for the app 103 to be stored in the non-secure area of the non-volatile memory 202 and a process for the key for decrypting the execution code of the app 103 to be stored in the secure module 102.

The MCU 201 in a non-secure state, detects the startup request for the app 103 and requests the MCU 201 in a secure state, to issue a decryption request for the app 103 (step S506). The MCU 201, in a secure state, receives the request for the decryption request for the app 103 and transmits a provision request for the decryption key and the signature generation key of the app 103 (step S507). The secure FW 301 receives the provision request for the decryption key and the signature generation key of the app 103 and generates the signature generation key of the app 103 (step S508). The secure FW 301 reduces the risk of using the same signature generation key for a long time by changing this key each time the app 103 is started up. The secure FW 301 transmits the decryption key of the app 103 and the signature generation key thereof to the MCU 201 in a secure state (step S509).

The MCU 201 in a secure state receives the decryption key for the app 103 and the signature generation key thereof, and decrypts the app 103, using the decryption key for the app 103 (step S510); and generates the signature data for the app 103, using the signature generation key of the app 103 (step S511). At step S511, for example, the MCU 201 in a secure state generates the signature data by combining the value calculated based on the signature generation key of the app 103 with every four bytes of the execution code of the decrypted app 103.

After generating the signature data for the app 103, the MCU 201 in a secure state expands the decrypted app 103 in the non-secure area of the volatile memory 203 (step S512). After the decrypted app 103 is expanded, the MCU 201 in a non-secure state starts up the app 103 (step S513).

At step S512, as to the expansion of the app 103, the app 103 may be obfuscated using a key different from the session key B for each subroutine; when the function for the obfuscation is invoked, the secure service 302 may decrypt this function; and after the execution is completed, the app 103 may again be obfuscated. The obfuscation of the app 103 will be described later with reference to FIG. 9. Instead of the obfuscation, the function to be protected may itself be excluded from those to be loaded for the boot; when the function is called, the secure service 302 may execute the loading; and after the execution, the code may be cleared by overwriting the memory area with a random number, etc. The key for executing the obfuscation is a key that is known only by the secure service 302 and that is stored in the secure area of the volatile memory 203.

FIG. 6 is a sequence diagram of an example of the tampering verification process for the app. The secure service 302 executes the tampering verification process for the app. However, the secure FW 301 may directly execute the tampering verification process for the app about once in several hundred to several thousand times or at a timing arbitrarily designated by the secure FW 301.

The secure FW 301 transmits an app tampering verification instruction to the secure service 302 (step S601). The secure service 302 receives the signature verification instruction, obtains the execution code of the app 103 in the non-secure area (step S602), and executes the tampering verification process for the app (step S603). The details of the tampering verification process will be described later with reference to FIG. 12. The secure service 302 transmits the verification result to the secure FW 301 (step S604).

If a verification result indicating no tampering is obtained as the process result at step S603, the secure service 302 permits continuation of the operation of the app 103. On the other hand, if a verification result indicating tampering or a failure of the verification is obtained, the secure service 302 terminates the execution of the app 103.

An example of a method of terminating the operation of the app 103 may be, for example, overwriting by the secure service 302, of the execution code of the app 103 expanded in the volatile memory 203 with zeroes, etc.; or no execution of the decryption of the obfuscated execution code during a process depicted in FIG. 9 and described later. The secure service 302 does not simply transmit any termination request to the app 103 because the app 103 has been tampered with by a third party and even if a termination request is transmitted to the app 103, the app 103 is not necessarily terminated.

As to the app tampering verification process, the secure FW 301 does not always calculate the hash value of the overall app 103 to be verified and therefore, the hash value may be calculated not by the computation by the computing circuit 224 but by software and therefore, the cost of the secure FW 301 can be reduced. The secure FW 301 does not always calculate the hash value of the overall app 103 and therefore, the execution code of the app 103 is not stored in the volatile memory 223. Therefore, the size of the volatile memory 223 can be reduced and the cost of the secure module 102 can be reduced.

As described with reference to FIG. 5, a case is present where a portion of the app 103 is not obfuscated or loaded. If a portion of the app 103 is encrypted, the secure service 302 calculates the hash value with the portion remaining encrypted. If the app 103 is not loaded, the secure service 302 excludes the app 103 not loaded, from those whose hash values are to be calculated.

FIG. 7 is a sequence diagram of an example of the tampering verification process of the secure service. The secure FW 301 executes the tampering verification process of the secure service 302. The secure FW 302 obtains the execution code of the secure service 302 in the secure area of the non-volatile memory 202 (step S701) and executes the tampering verification process for the secure service 302 (step S702). Details of the tampering verification process will be described later with reference to FIG. 12.

As to the result of the process executed at step S702, if a verification result indicating no tampering is obtained, the secure FW 301 permits the continuation of the operation of the secure service 302. On the other hand, if a verification result indicating tampering or a failure of the verification is obtained, the secure FW 301 terminates the execution of the secure service 302. The secure FW 301 may terminate the execution of the secure service 302 and may further terminate the execution of the app 103. Thereby, the computer system 200 can minimize the leakage of information handled by the app 103.

FIG. 8 is a sequence diagram of an example of the authentication processes for the secure service and the app. The authentication processes for the secure service and the app are regularly executed in, for example, once every one minute. The secure FW 301 generates "Seed" and stores "Seed" as a challenge random number "A" (step S801). The "challenge random number A" is, for example, a random number of 16 [bytes].

The secure FW 301 transmits to the secure service 302, an execution request that is for the authentication process and includes the challenge random number A (step S802), and calculates response data "A" from the challenge random number A (step S803). The "response data A" is, for example, a value of 16 [bytes] obtained by calculation using the challenge random number A with a certain fixed value. The secure module 102 secretly retains therein a generation algorithm for "Seed" and an algorithm to process "Seed" using the certain fixed value and thereby, prevents any external leakage of "Seed".

When the secure service 302 receives the execution request for the authentication process, the secure service 302 generates a challenge random number B by processing from the challenge random number A using another fixed value (step S804), transmits the challenge random number B to the app 103 (step S805), and calculates the response data B from the challenge random number B (step S806).

The app 103 receives the challenge random number B and calculates the response data B from the challenge number B (step S807) and transmits the response data B to the secure service 302 (step S808).

The secure service 302 receives the response data B and from the calculated response data B and the received response data B, verifies whether the authentication has been successfully executed (step S809). As to the process executed at step S809, if a verification result indicating successful execution of the authentication is obtained, the secure service 302 determines that the authentication is successfully executed and therefore, permits the continuation of the operation of the app 103. On the other hand, if a verification result indicating failure of the authentication or failure of the verification is obtained, the secure service 302 determines that the authentication has failed and terminates the execution of the app 103.

The secure service 302 receives the challenge random number A and calculates the response data A from the challenge random number A (step S810) and transmits the response data A to the secure FW 301 (step S811).

The secure FW 301 receives the response data A and from the calculated response data A and the received response data A, verifies whether the authentication has been successfully executed (step S812). As to the process executed at step S812, if a verification result indicating successful execution of the authentication is obtained, the secure FW 301 determines that the authentication is successfully executed and therefore, permits the continuation of the operation of the secure service 302. On the other hand, if a verification result indicating failure of the authentication or failure of the verification is obtained, the secure FW 301 determines that the authentication has failed and terminates the execution of the secure service 302.

It is assumed that, when the authentication process for the app is executed, the app 103 has embedded therein the execution code that executes the authentication process using a secured tool by the development engineer, etc., of the app 103. For example, the embedded authentication process is a certain thread and this thread waits for the challenge random number B to be transmitted at step S805. When the thread accepts the challenge random number B, the thread executes the operations at steps S807 and S808. After the operation at step S808 comes to an end, the thread again waits for the challenge random number B to be transmitted at step S805.

FIG. 9 is a sequence diagram of an example of an execution process for a portion to be obfuscated of the app. The app 103 detects the obfuscated execution code (step S901) and transmits a release request for the obfuscated execution code (step S902).

The secure service 302 receives the release request and checks the verification results of: the tampering verification processes executed for the app and the secure service; and the verification results of the authentication verification processes executed therefor (step S903).

If the verification results of the tampering verification processes executed for the app and the secure service both indicate no tampering, and the verification results of the authentication verification processes executed therefor both indicate successful execution of the authentication, the secure service 302 continues the releasing of the obfuscation. On the other hand, if the above condition is not satisfied, the secure service 302 terminates the releasing of the obfuscation.

If the releasing of the obfuscation is continued, the secure service 302 reads the execution code for which the release request has been received (step S904), releases the obfuscated execution code (step S905), expands the execution code obtained after the releasing of the obfuscation (step S906), and notifies the app 103 of the completion of the releasing (step S907).

The app 103 receives the notification of the completion of the releasing and executes the execution code obtained after the releasing of the obfuscation (step S908). After completing the execution, the app 103 notifies the secure service 302 of the end of the execution of the execution code obtained after the releasing of the obfuscation (step S909). As to the process executed at step S909, if no notification of the end of the execution of the execution code obtained after the releasing of the obfuscation is received from the app 103 even after a specific time period, the secure service 302 forcibly causes the app 103 to return to a secure state, terminates the execution of the app 103, and thereby, maintains the security.

The secure service 302 receives the notification of the end of the execution of the execution code obtained after the releasing of the obfuscation and transmits a determination request for a new obfuscation scheme to the secure FW 301 (step S910). The secure FW 301 receives the determination request for a new obfuscation scheme, determines the new obfuscation scheme (step S911), and transmits the determined obfuscation scheme to the secure service 302 (step S912).

An example of the obfuscation scheme can be zero-clearing, an XOR using a random number, or a combination of zero-clearing and an XOR using a random number. For example, when zero-clearing is executed, the secure service 302 fully replaces with zeroes, the execution code expanded in the non-secure area of the volatile memory 203. When the zero-cleared execution code is again executed, the secure service 302 obtains the execution code in the non-volatile memory 202 and writes the obtained execution code into the area filled with zeroes.

The secure service 302 receives the determined obfuscation scheme and using the new obfuscation scheme, again obfuscates the execution code obtained after the releasing of the obfuscation (step S913) and expands the execution code after again being obfuscated (step S914). After the expansion comes to an end of the execution code obtained after being again obfuscated, the secure service 302 notifies the app 103 of the completion of the obfuscation again executed (step S915).

FIG. 10 is a flowchart of an example of a procedure for an operation process procedure of the controller. The controller monitors the state of the MCU 201, and the state of the address of the access destination or that of the I/F, and determines permission or denial for the access based on the combination of these two.

The controller detects the access to the access destination (step S1001) and determines which one of the following combinations the combination of the state of the MCU 201 and the address area of the access destination matches (step S1002). The combinations are four in total because the states of the MCU 201 are two that are the secure state and the non-secure state, and the access destinations are two that are the secure area and the non-secure area.

If the state of the MCU 201 is the secure state and the address area of the access destination is the secure area (step S1002: SECURE STATE AND SECURE AREA), the controller permits the access to the access destination (step S1003).

If the state of the MCU 201 is the non-secure state and the address area of the access destination is the secure area (step S1002: NON-SECURE STATE AND SECURE AREA), the controller denies the access to the access destination (step S1004).

If the state of the MCU 201 is the secure state and the address area of the access destination is the non-secure area (step S1002: SECURE STATE AND NON-SECURE AREA), the controller permits the access to the access destination (step S1005).

If the state of the MCU 201 is the non-secure state and the address area of the access destination is the non-secure area (step S1002: NON-SECURE STATE AND NON-SECURE AREA), the controller permits the access to the access destination (step S1006).

After any one of the operations at steps S1003 to S1006 comes to an end, the controller suspends operation. The execution of the operation process procedure of the controller enables the computer system 200 to prevent any unauthorized access by malicious software executed in the non-secure mode.

Figure 11:
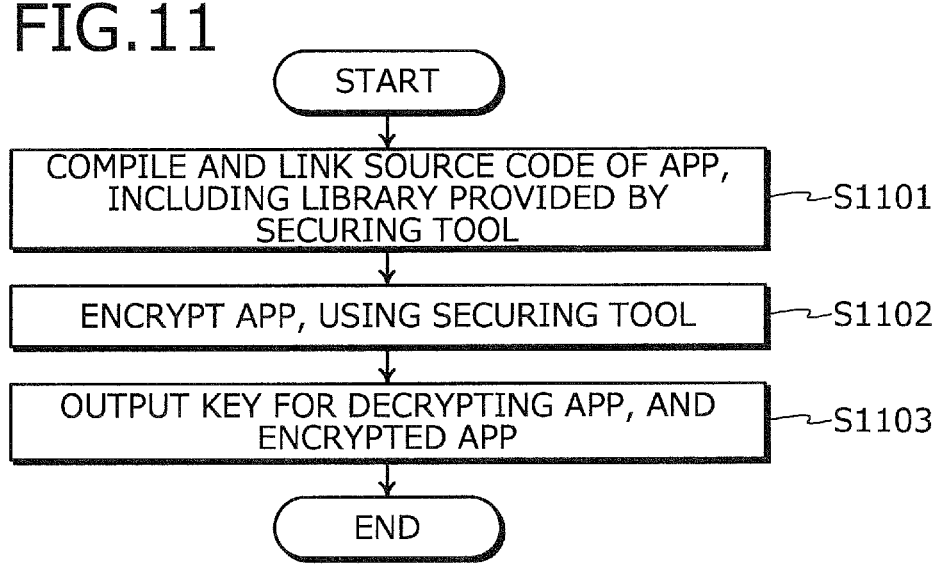
FIG. 11 is a flowchart of an example of a procedure for an encryption process for the application software.

FIG. 11 is a flowchart of an example of a procedure for the encryption process for the app. The encryption process for the app is a process executed after the app 103 is developed and is a process of encrypting the app 103. The apparatus executing the encryption process for the app is an apparatus different from the computer system 200 and is an apparatus equipped with a cross compiler that generates execution code for the computer system 200. Hereinafter, the "apparatus equipped with the cross compiler" will be referred to as "cross compiler apparatus".

The cross compiler apparatus compiles and links the source code of the app 103 including the library provided by the secured tool (step S1101). The library provided by the secured tool is a library including the execution code of the process executed by the app 103 described with reference to FIGS. 8 and 9.

Using the secured tool, the cross compiler apparatus encrypts the app 103 generated by the link (step S1102). When the encryption is executed, the cross compiler apparatus encrypts the app 103 using, for example, the encryption key generated using "Seed" of the decryption key for the app 103 determined by the development engineer of the app 103.

The cross compiler apparatus outputs the key for decrypting the app 103, and the encrypted app 103 (step S1103). The key for decrypting the app 103 is the same key as the encryption key when, for example, the app 103 is encrypted in a common key encryption scheme such as AES encryption.

The cross compiler apparatus registers the encrypted app 103 into, for example, an app 103 distribution site by an operation of the development engineer, and stores the key for decrypting the app 103 in the secure module 102 by an operation of the development engineer.

The user of the computer system 200 purchases the computer system 200 including the secure module 102. After the purchase, the computer system 200 obtains the encrypted app 103 from the app distribution site by an operation of the user of the computer system 200. Thereby, the computer system 200 can execute the app 103 guaranteeing the secure state according to this embodiment.

Figure 12:
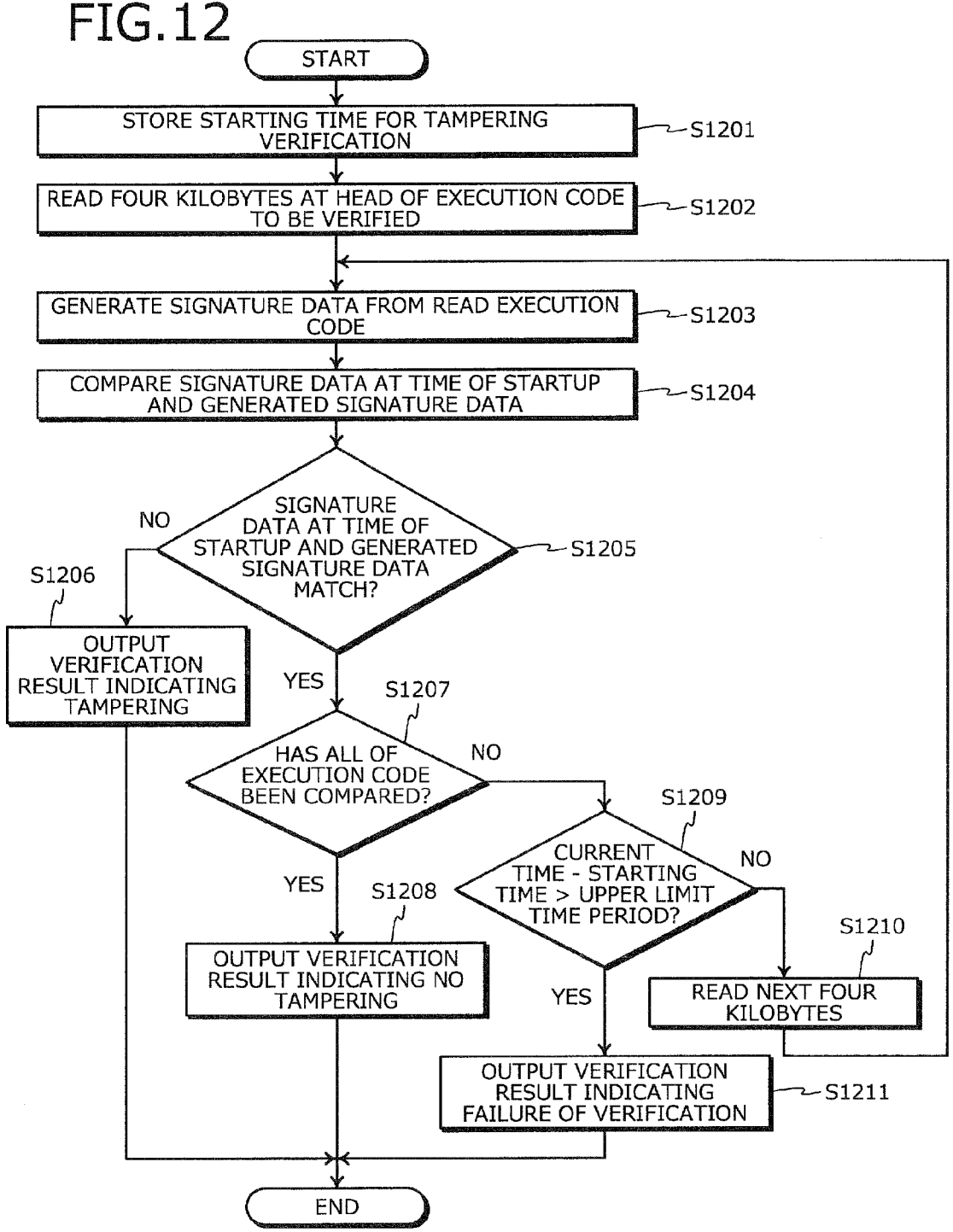
FIG. 12 is a flowchart of an example of a procedure for the tampering verification process.

FIG. 12 is a flowchart of an example of a procedure for the tampering verification process. The tampering verification process is a process of verifying whether the app 103 or the secure service 302 has been tampered with. The tampering verification process for the app is executed by the secure service 302. The tampering verification process for the secure service 302 is executed by the secure FW 301. The description with reference to FIG. 12 will be made taking an example of the tampering verification process for the secure service 302.

The secure FW 301 stores the starting time to start the tampering verification (step S1201) and reads the four kilobytes at the head of the execution code to be verified (step S1202). The "execution code to be verified" is the execution code of the secure service 302. On the other hand, for the tampering verification process executed for the app, the execution code to be verified is the execution code of the app 103.

The secure FW 301 generates the signature data from the read execution code (step S1203). The secure FW 301 generates the signature data using the session key A. On the other hand, for the tampering verification process for the app, the secure service 302 generates the signature data using the key generated at step S508.

The secure FW 301 compares the signature data at the time of the startup and the generated signature data (step S1204). The "signature data at the time of the startup" is the signature data generated in the operation at step S416, the time of the startup of the secure service 302. On the other hand, for the tampering verification process for the app, the signature data at the time of the startup is the signature data generated in the operation at step S511, the time of the startup of the app 103.

The secure FW 301 determines whether the signature data at the time of the startup and the generated signature data match (step S1205). If the secure FW 301 determines that the signature data at the time of the startup and the generated signature data do not match (step S1205: NO), the secure FW 301 outputs a verification result indicating tampering (step S1206). If a verification result indicating tampering is obtained, this means that it is verified that the execution code to be verified is not in a secure state.

If the secure FW 301 determines that the signature data at the time of the startup and the generated signature data match (step S1205: YES), the secure FW 301 determines whether all of the execution code has been compared (step S1207). If the secure FW 301 determines that all of the execution code has been compared (step S1207: YES), the secure FW 301 outputs a verification result indicating no tampering (step S1208). If a verification result indicating no tampering is obtained, this means that it is verified that the execution code to be verified is in a secure state.

If the secure FW 301 determines that a portion of the execution code has not been compared (step S1207: NO), the secure FW 301 determines whether a time period between the current time and the starting time exceeds the upper limit time period (step S1209). If the secure FW 301 determines that the time period between the current time and the starting time is less than or equal to the upper limit time period (step S1209: NO), the secure FW 301 reads the next four kilobytes (step S1210) and proceeds to the operation at step S1203.

When the secure FW 301 determines that the time period between the current time and the starting time exceeds the upper limit time period (step S1209: YES), the secure FW 301 outputs the verification result indicating a failure of the verification (step S1211). When the verification result indicating the failure of the verification is obtained, this means that it is verified that the execution code to be verified is not in a secure state. The case where the time period between the current time and the starting time exceeds the upper limit time period is, for example, the case where accesses to the memory frequently occur due to an unauthorized app, etc., and, as a result, the process of the flowchart depicted in FIG. 12 is delayed.

After the operation at step S1206, S1208, or S1211 comes to an end, the secure FW 301 causes the tampering verification process to come to an end. The execution of the tampering verification process enables the computer system 200 to verify whether the execution code to be verified has been tampered with.

Figure 13:
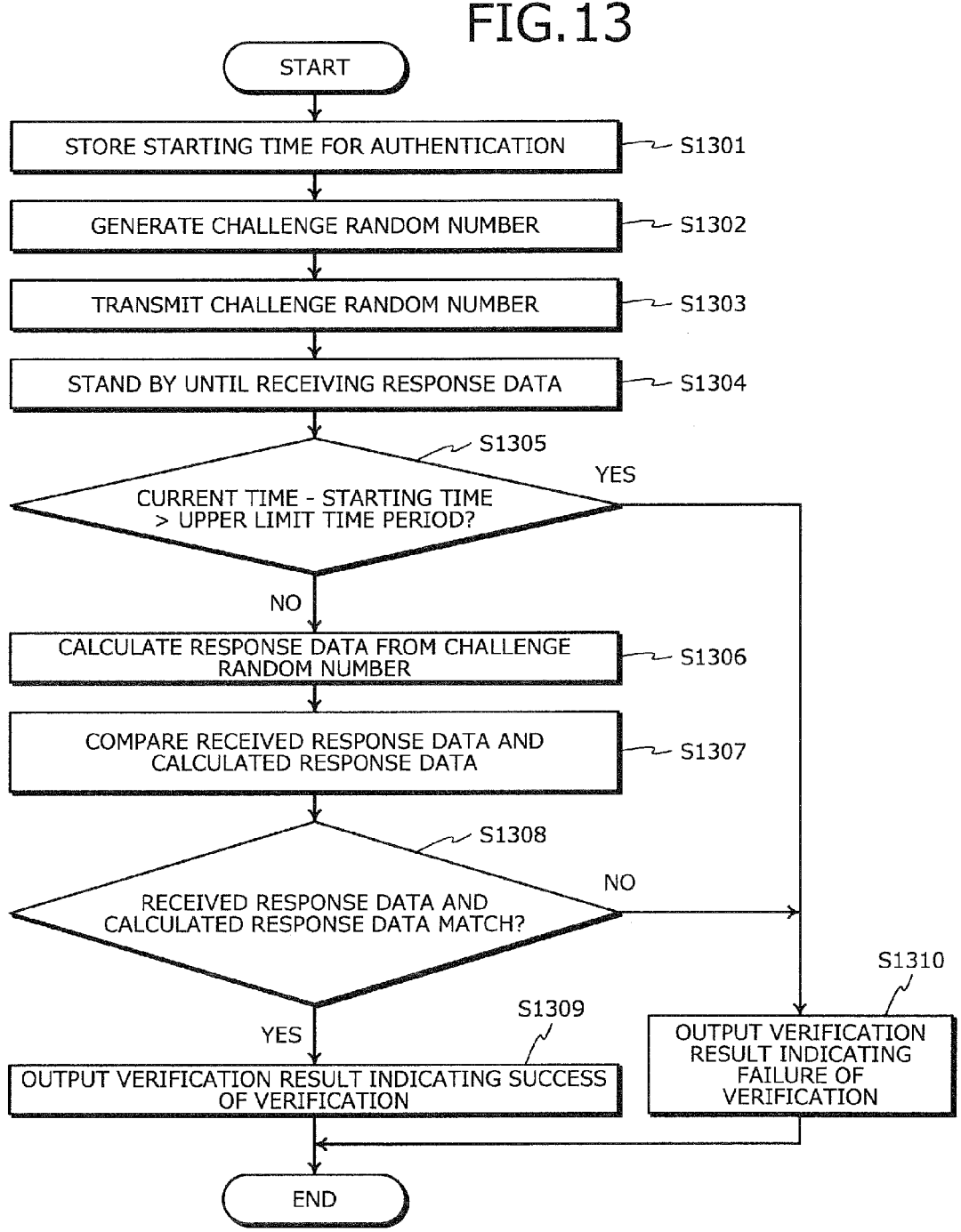
FIG. 13 is a flowchart of an example of a procedure for the authentication process.

FIG. 13 is a flowchart of an example of a procedure for the authentication process. The authentication process is a process of verifying whether the app 103 or the secure service 302 is a valid communication counterpart. The authentication process for the app is executed by the secure service 302. The authentication process for the secure service is executed by the secure FW 301. The description with reference to FIG. 13 will be made taking an example of the authentication process for the secure service 302, and the authentication process for the app will be described concurrently.

The secure FW 301 stores the starting time to start the authentication (step S1301) and generates a challenge random number (step S1302). For example, the secure FW 301 generates the challenge random number A according to the execution code of the authentication process in the secure module 102. On the other hand, for the authentication process for the app, the secure service 302 generates the challenge random number B based on the received challenge random number A.

The secure FW 301 transmits the challenge random number (step S1303). For example, the secure FW 301 transmits the challenge random number A to the secure service 302. On the other hand, for the authentication process for the app, the secure service 302 transmits the challenge random number A to the app 103.

The secure FW 301 stands by until the secure FW 301 receives the response data (step S1304). For example, the secure FW 301 stands by until the secure FW 301 receives the response data A from the secure service 302. On the other hand, for the authentication process for the app, the secure service 302 stands by until the secure service 302 receives the response data B from the app 103.

The secure FW 301 determines whether the time period between the current time and the starting time exceeds the upper limit time period (step S1305). If the secure FW 301 determines that the time period between the current time and the starting time is less than or equal to the upper limit time period (step S1305: NO), the secure FW 301 calculates the response data from the challenge random number (step S1306). For example, the secure FW 301 calculates the response data A from the challenge random number A. On the other hand, for the authentication process for the app, the secure service 302 calculates the response data B from the challenge random number B.

The secure FW 301 compares the received response data and the calculated response data (step S1307). For example, the secure FW 301 compares the response data A received from the secure service 302 and the calculated response data A. On the other hand, for the authentication process for the app, the secure service 302 compares the response data B received from the app 103 and the calculated response data B.

The secure FW 301 determines whether the received response data and the calculated response data match (step S1308). If the secure FW 301 determines that the received response data and the calculated response data match (step S1308: YES), the secure FW 301 outputs a verification result indicating success of the verification (step S1309).

On the other hand, if the secure FW 301 determines that the received response data and the calculated response data do not match (step S1308: NO) or if the secure FW 301 determines that the time period between the current time and the starting time exceeds the upper limit time period (step S1305: YES), the secure FW 301 outputs a verification result indicating failure of the verification (step S1310).

An example of a case where "step S1305: YES" is established is a case where control has been taken over by a malicious app. It is assumed, for example, that the execution code of the secure service 302 may cause a buffer overrun. In this case, the malicious app may be able to cause the secure service 302 to execute the execution code designated by the malicious app due to the buffer overrun. In this case, the secure service 302 does not transmit the response data A to the secure FW 301, though during the buffer overrun, no tampering of the execution code is executed and therefore, the tampering verification process depicted in FIG. 12 provides a verification result indicating no tampering.

After the operation at step S1309 or S1310 comes to an end, the secure FW 301 causes the verification process to come to an end. The execution of the verification process enables the computer system 200 to verify whether the app 103 or the secure service 302 is a valid communication counterpart.

As described, according to the computer system 200, the information processing apparatus 101 executes the process of verifying the validity of the app 103 and the secure module 102 verifies the validity of the process of verifying the validity of the app 103. Thereby, the computer system 200 can execute the app 103 in a secure state, while suppressing the processing load on the secure module 102.

According to the computer system 200, the feature amount of the execution code of the secure service 302 may be stored and may be compared with the feature amount of the execution code of the secure service 302 under execution, whereby whether the secure service 302 is in a secure state may be verified. Thus, the computer system 200 can identify whether the execution code of the secure service 302 has been tampered with and the secure service 302 is not in a secure state, or the execution code of the secure service 302 has not been tampered with and the secure service 302 is in a secure state. When the secure service 302 is in a secure state, the computer system 200 can verify whether the app 103 is in a secure state, using the secure service 302.

According to the computer system 200, the secure service 302 may store the encrypted code that is obtained by encrypting the secure service 302, may decrypt the encrypted code, and may store the feature amount of the execution code of the secure service 302 obtained by the decryption. In this case, when the encrypted code is falsified, the execution code cannot be normally restored even after being decrypted and therefore, the tampering of the encrypted code is difficult. Therefore, it can be guaranteed that no tampering has occurred with the execution code of the secure service 302 obtained by the decrypting and the computer system 200 can execute the tampering verification and the authentication process for the secure service 302 based on the feature amount of the execution code for there is no possibility of tampering.

According to the computer system 200, the encrypted code obtained by encrypting the secure service 302 may be stored and according to the execution code of the secure service 302 obtained by decrypting the encrypted code, the information processing apparatus 101 may verify whether the app is in a secure state. Thereby, the computer system 200 can execute the tampering verification and the authentication process for the app 103 according to the execution code of the secure service 302 for which there is no possibility of tampering.

According to the computer system 200, the secure FW 301 may verify whether the secure service 302 is a valid communication counterpart and whether the secure service 302 is in a secure state, by the authentication based on the challenge response scheme. Thereby, the computer system 200 can identify that the secure service 302 is not in a secure state even if the secure service 302 is attacked and the control thereof is taken without tampering with the execution code.

According to the computer system 200, if it is verified that the secure service 302 is not in a secure state, the execution of the secure service 302 may be terminated. Thereby, the computer system 200 can terminate the secure service 302 that may execute an unauthorized operation, and can minimize the leakage of information.

The computer system 200 according to the first embodiment executes the tampering verification processes for the secure service 302 and the secure FW 301 distributes these processes thereto and therefore, the volume of communication between the information processing apparatus 101 and the secure module 102 can be reduced. Even the secure module 102 having slower IO can realize highly robust security and therefore, cost reductions and the security of the secure module 102 can simultaneously be established.

As described, the content of the processing executed by the secure module 102 is reduced and therefore, substitution by software processes is enabled without additionally mounting any circuit that executes the encryption, the decryption, and the hash processes. Therefore, the secure module 102 can be realized at a lower cost.

The computer system 200 can cause the MCU 201, in a secure state, to execute the authentication, the tampering detection, and the obfuscation while secretly retaining especially important information in the secure module 102 that is inaccessible by any third party; and therefore, can maintain high security.

A computer system according to a second embodiment is a system into/from which the secure module 102 can be inserted and removed. Portions identical to those described in the first embodiment are given the same reference numerals used in the first embodiment and will not again be depicted and described.

Figure 14:
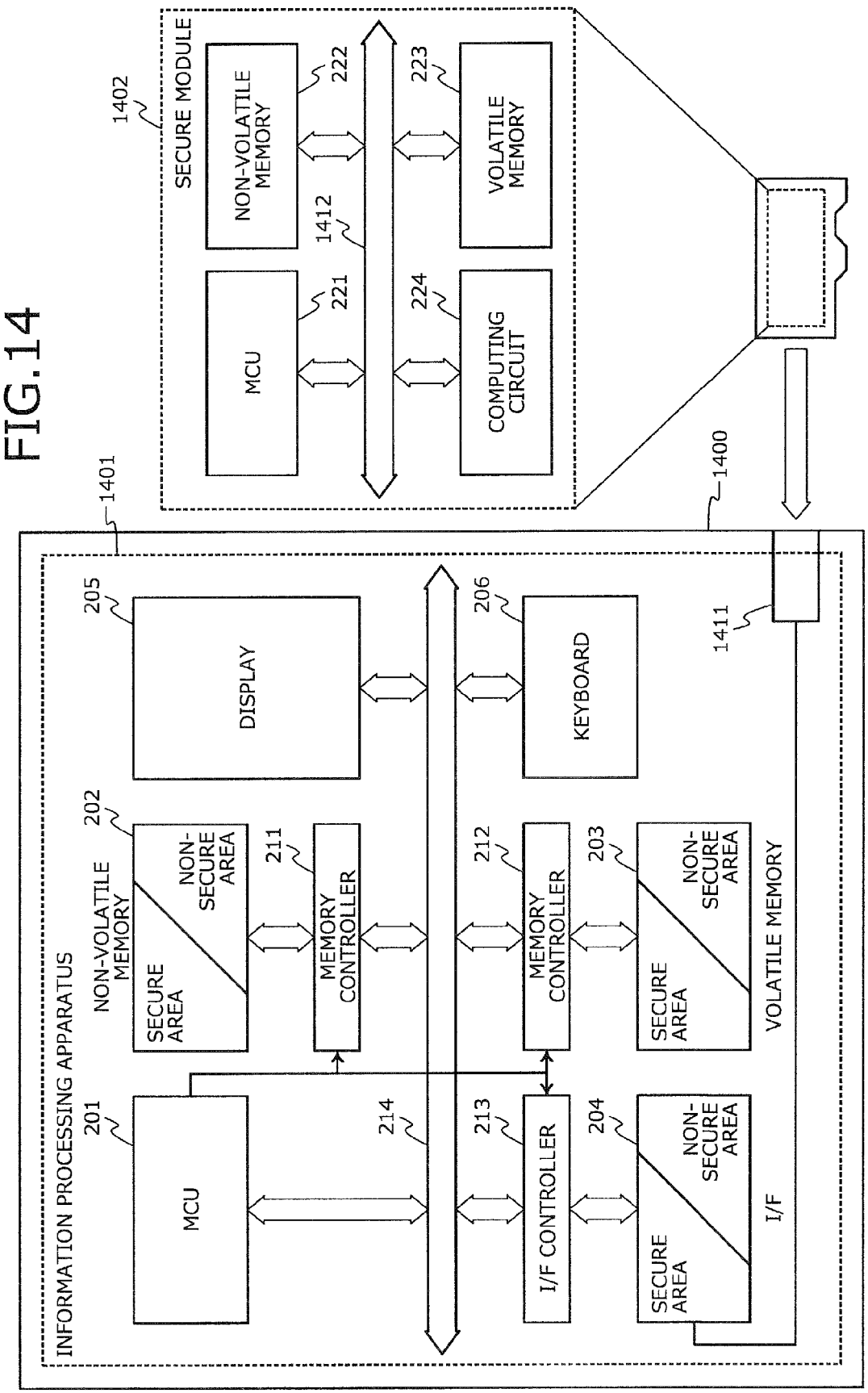
FIG. 14 is a block diagram of an example of configuration of the computer system according to a second embodiment.

FIG. 14 is a block diagram of an example of configuration of the computer system according to the second embodiment. The computer system 1400 includes an information processing apparatus 1401 and a secure module 1402.

The information processing apparatus 1401 includes the components from the MCU 201 to the I/F controller 213, and an insertion and removal detection mechanism 1411. The insertion and removal detection mechanism 1411 is connected to the I/F 204. The secure module 1402 includes the components from the MCU 221 to the computing circuit 224. The components from the MCU 221 to the computing circuit 224 are connected to each other by a bus 1412.

The insertion and removal detection mechanism 1411 includes a terminal that detects a state where the secure module 1402 is inserted, a state where the secure module 1402 is removed, change from the insertion state to the removal state, and change from the removal state to the insertion state.

The insertion/removal detection by the insertion and removal detection mechanism 1411 is defined as an external interrupt at a general-purpose input and output terminal in the secure state of the MCU 201. Any unauthorized mask from the non-secure state can be prevented by causing the interrupt to have a feature of being non-maskable from the MCU 201 in a non-secure state.

Figure 15:
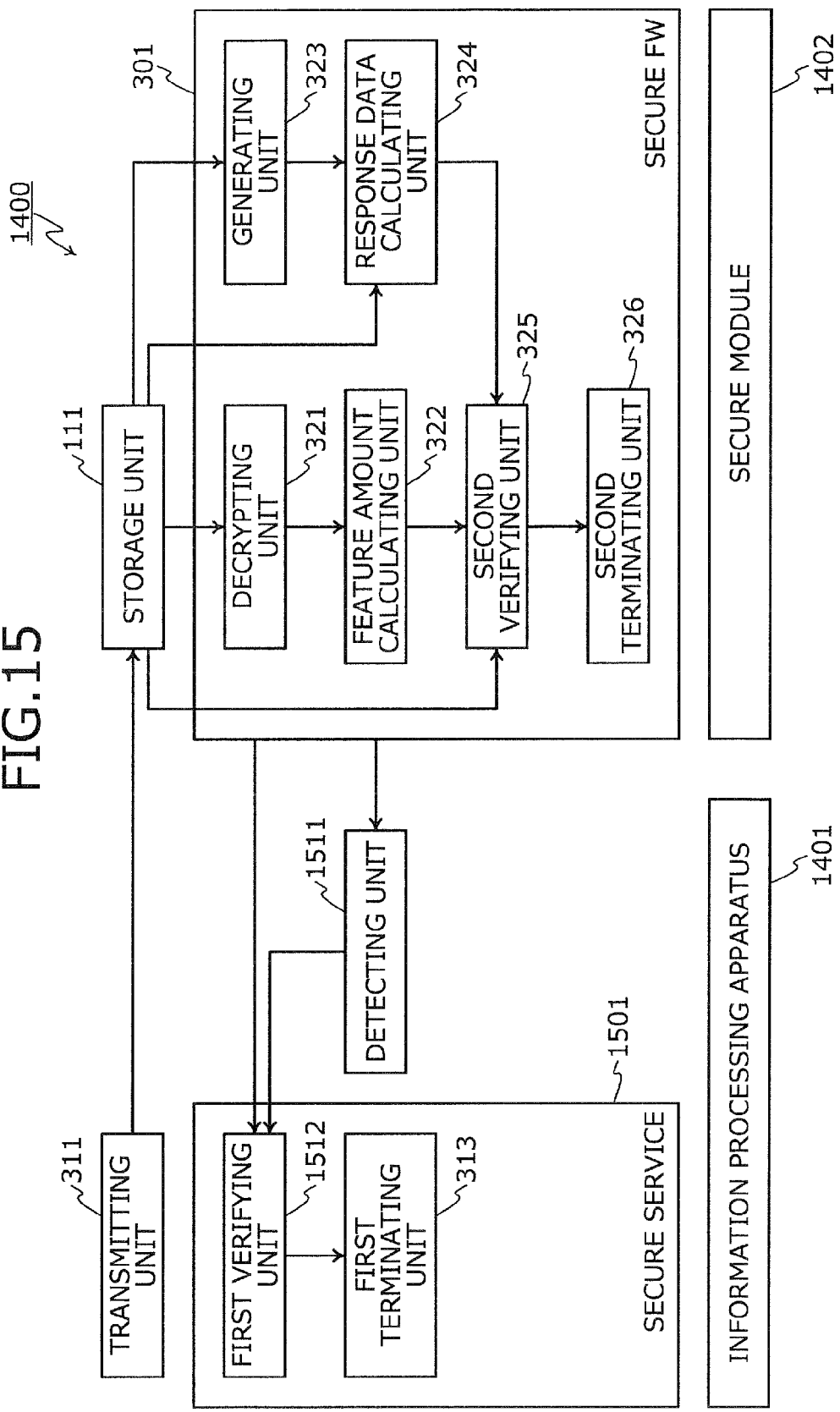
FIG. 15 is a block diagram of an example of a functional configuration of the computer system according to the second embodiment.

FIG. 15 is a block diagram of an example of a functional configuration of the computer system according to the second embodiment. The computer system 1400 includes the storage unit 111, the transmitting unit 311, a detecting unit 1511, a first verifying unit 1512, the first terminating unit 313, and the components from the decrypting unit 321 to the second terminating unit 326.

The detecting unit 1511 is a function corresponding to the insertion and removal detection mechanism 1411. The first verifying unit 1512 and the first terminating unit 313 are functions included in a secure service 1501 executed by the information processing apparatus 1401. The secure service 1501 implements the functions of the first verifying unit 1512 and the first terminating unit 313 by executing on the MCU 201, the programs stored in the storage apparatus. The "storage apparatus" is, for example, the non-volatile memory 202 depicted in FIG. 14. The secure service 1501 corresponds to the first verification process 104 depicted in FIG. 1.

The detecting unit 1511 detects that the secure module 1402 has been removed from the computer system 1400 and that the secure module 1402 has been inserted into the computer system 1400. The detection result is stored to the secure area of the volatile memory 203.

The first verifying unit 1512 verifies that the app 103 is not in a secure state when the detecting unit 1511 detects that the secure module 1402 has been removed from the computer system 1400, and starts the execution of the first verification process 104 when the detecting unit 1511 detects that the secure module 1402 has been inserted into the computer system 1400.

FIG. 16 is a flowchart of an example of a procedure for a process executed when the insertion or the removal state of the secure module changes. The secure service 1501 executes the process executed when the insertion or the removal state of the secure module 1402 changes.

The secure service 1501 detects an interrupt indicating that a change in the insertion or the removal state of the secure module 1402 has been detected (step S1601) and determines which one of the following states the insertion or the removal state of the secure module 1402 (step S1602). The states are states where the secure module 1402 has been inserted and where the secure module 1402 has been removed. If the secure service 1501 determines that the state is the state where the secure module 1402 has been inserted (step S1602: INSERTED STATE), the secure service 1501 permits starting up of the app 103 (step S1603).

As to the operation at step S1603, if the decryption request for the app 103 is received at step S506 after the execution of the operation at step S1603, the secure service 1501 permits the startup request of the app 103 and executes the operation at step S507. On the other hand, if the secure service 1501 has not yet executed the operation at step S1603, the secure service 1501 does not permit the startup request of the app 103 and therefore, does not execute the operation at step S507.

If the secure service 1501 determines that the state is the state where the secure module 1402 has been removed (step S1602: REMOVED STATE), the secure service 1501 determines which one of the following states the operation state of the app 103 matches (step S1604). The states are an operating state and a terminated state. If the secure service 1501 determines that the operation state of the app 103 is the operating state (step S1604: OPERATING STATE), the secure service 1501 displays on the display 205, a message indicating execution of an unauthorized operation (step S1605). As to the operation at step S1605, the secure service 1501 may display a message urging re-insertion of the secure module 1402. The secure module 1501 terminates the execution of the app 103 (step S1606). For example, as the method of terminating the execution of the app 103, the secure service 1501 overwrites a portion of or all of the memory having the app 103 expanded therein.

If the secure service 1501 determines that the operation state of the app 103 is the terminated state (step S1604: TERMINATED STATE), the secure service 1501 causes the process executed when the insertion or the removal state of the secure module 1402 changes, to come to an end. In the case where "step S1604: TERMINATION STATE" is established, if any data is present that was expanded during the past operation of the app, the secure service 1501 excludes the expanded data.

After the operation at step S1603 or S1606 comes to an end, the secure service 1501 ends the process that is executed when the insertion or the removal state of the secure module 1402 changes. The execution of the process executed when the insertion or the removal state of the secure module 1402 changes enables the computer system 1400 to terminate an app that cannot guarantee a secure state due to the change in the insertion or the removal state of the secure module 1402.

As described, according to the computer system 1400, when the insertion and removal detection mechanism 1411 detects that the secure module 1402 has been removed from the computer system 1400, it is verified that the app 103 is not in a secure state. Thereby, the computer system 1400 can recognize that the secure state of the app 103 is not guaranteed. The computer system 1400 verifies that the app 103 is not in a secure state and terminates the execution of the app 103 and thereby, can suppress any leakage of information.

According to the computer system 1400, when the insertion and removal detection mechanism 1411 detects that the secure module 1402 has been inserted into the computer system 1400, the execution of the secure service may be started. Thereby, the computer system 1400 can safely use the app 103 that handles information desired to be secretly retained.

The verification method described in the present embodiment may be implemented by executing a prepared program on a computer such as a personal computer and a workstation. The secure FW 301, the secure services 302 and 1501 are stored on a non-transitory, computer-readable recording medium such as a hard disk, a flexible disk, a CD-ROM, an MO, and a DVD, are read out from the computer-readable medium, and executed by the computer. The secure FW 301, the secure services 302 and 1501 may be distributed through a network such as the Internet.

According to an aspect of the embodiments, an effect is achieved that suppression of the processing load on the secure module can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system comprising:
a secure processor structured to prevent information stored therein from being externally referenced; and
an information processing apparatus coupled to the processor, wherein
the information processing apparatus includes a first processor configured to execute a first verification process of verifying whether an application under execution by the information processing apparatus is in a secure state,
the secure processor includes:
a second processor; and
a storage configured to store at least any one among a first feature amount obtained by extracting a feature of execution code of the first verification process, and execution code of an authentication process of authenticating the first verification process, the storage further configured to store encrypted code obtained by encrypting the execution code of the first verification process, and a decryption key capable of decrypting the encrypted code, and
the second processor is configured to decrypt the execution code of the first verification process from the encrypted code, by using the decryption key,
calculate a second feature amount obtained by extracting a feature of the execution code of the first verification process under execution by the first computer, calculate and store to the storage, the first feature amount obtained by extracting the feature of the decrypted execution code of the first verification process, and
verify whether the first verification process under execution by the first processor is in a secure state, by comparing the calculated second feature amount and the first feature amount stored in the storage.

2. The system according to claim 1, wherein
the information processing apparatus is configured to store therein the encrypted code, and
the first processor is configured to:
transmit the encrypted code to the secure module; and
verify whether the application is in a secure state, according to the execution code of the first verification process transmitted by the secure module, consequent to the first processor transmitting the encrypted code.

3. A system comprising:
a secure module structured to prevent information stored therein from being externally referenced; and
an information processing apparatus coupled to the secure module, wherein
the information processing apparatus includes a first processor configured to execute a first verification process of verifying whether an application under execution by the information processing apparatus is in a secure state,
the secure module includes:
a second processor; and
a storage configured to store at least any one among a first feature amount obtained by extracting a feature of execution code of the first verification process, and execution code of an authentication process of authenticating the first verification process, and
the second processor is configured to:
execute a second verification process of verifying whether the first verification process under execution by the first processor is in a secure state, based on stored contents of the storage;
generate according to the execution code of the authentication process, a challenge random number used to authenticate the first verification process;
calculate according to the execution code of the authentication process, first response data based on the generated challenge random number;
transmit the challenge random number to the information processing apparatus; and
verify whether the first verification process under execution by the first processor is in a secure state, by comparing the first response data calculated by the second processor and second response data calculated based on the transmitted challenge random number, the second response data being calculated in the first verification process under execution by the first processor included in the information processing apparatus.

4. The system according to claim 1, wherein
the secure module is insertable into and removable from the system, and
the first processor is configured to verify that the application is not in a secure state, when the first processor detects that the secure module has been removed from the system.

5. The system according to claim 1, wherein
the secure module is insertable into and removable from the system, and
the first processor is configured to start execution of the first verification process when the first processor detects that the secure module has been inserted into the system.

6. A system comprising:
a secure processor structured to prevent information stored therein from being externally referenced; and
an information processing apparatus coupled to the processor, wherein the information processing apparatus includes a first processor configured to execute a first verification process of verifying whether an application under execution by the information processing apparatus is in a secure state,
the secure processor includes:
  a second processor; and
  a storage configured to store at least any one among a first feature amount obtained by extracting a feature of execution code of the first verification process, and extraction of execution code of an authentication process of authenticating the first verification process, and
the second processor is configured to execute a second verification process of verifying whether the first verification process under execution by the first processor is in a secure state, based on stored contents of the storage, and
terminate execution of the first verification process executed by the first processor, upon verifying that the first verification process under execution by the first processor is not in a secure state.

7. A secure apparatus coupled to an information processing apparatus including a first processor, and structured to prevent information stored in the secure apparatus from being externally referenced, the secure apparatus comprising:
a storage configured to store at least any one among a first feature amount obtained by extracting a feature of execution code for executing, by the first processor, a first verification process of verifying whether an application under execution by the information processing apparatus is in a secure state, and execution code of an authentication process of authenticating the first verification process, the storage further configured to store encrypted code obtained by encrypting the execution code of the first verification process, and a decryption key capable of decrypting the encrypted code; and
a second processor configured to decrypt the execution code of the first verification process from the encrypted code, by using the decryption key,
calculate a second feature amount obtained by extracting a feature of the execution code of the first verification process under execution by the first computer,
calculate and store to the storage, the first feature amount obtained by extracting the feature of the decrypted execution code of the first verification process,
and verify whether the first verification process under execution by the first processor is in a secure state, by comparing the calculated second feature amount and the first feature amount stored in the storage.

8. The system according to claim 3, wherein
the secure module is insertable into and removable from the system, and
the first processor is configured to verify that the application is not in a secure state, when the first processor detects that the secure module has been removed from the system.

9. The system according to claim 3, wherein
the secure module is insertable into and removable from the system, and
the first processor is configured to start execution of the first verification process when the first processor detects that the secure module has been inserted into the system.

10. The system according to claim 6, wherein
the secure module is insertable into and removable from the system, and
the first processor is configured to verify that the application is not in a secure state, when the first processor detects that the secure module has been removed from the system.

11. The system according to claim 6, wherein
the secure module is insertable into and removable from the system, and
the first processor is configured to start execution of the first verification process when the first processor detects that the secure module has been inserted into the system.

* * * * *

UNITED STATES PATENT AND TRADEMARK OFFICE
CERTIFICATE OF CORRECTION

PATENT NO. : 9,256,731 B2
APPLICATION NO. : 14/292053
DATED : February 9, 2016
INVENTOR(S) : Tetsuya Sasao et al.

Page 1 of 1

It is certified that error appears in the above-identified patent and that said Letters Patent is hereby corrected as shown below:

In the claims

Column 19, Line 57, Claim 1
Delete "the" and insert -- the secure --, therefor.

Column 21, Line 17, Claim 6
Delete "the" and insert -- the secure --, therefor.

Column 21, Line 28, Claim 6
Delete "extraction of execution" and insert -- execution --, therefor.

Signed and Sealed this
Tenth Day of May, 2016

Michelle K. Lee
*Director of the United States Patent and Trademark Office*